United States Patent
Stern et al.

(10) Patent No.: US 7,428,995 B1
(45) Date of Patent: Sep. 30, 2008

(54) SCANNING DEVICES AND METHODS USING SURFACE EMITTING LASER DIODES

(75) Inventors: Miklos Stern, Woodmere, NY (US); Chinh Tan, Setauket, NY (US); Yajun Li, Oakdale, NY (US); Howard Shepard, Great River, NY (US); Thomas Mazz, Huntington, NY (US); Eric Barkan, Novato, CA (US); Vikram Bhargava, Nesconsett, NY (US); Andrew Fusco, Smithtown, NY (US); Mark Weitzner, Plainview, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1476 days.

(21) Appl. No.: 09/777,076

(22) Filed: Feb. 5, 2001

Related U.S. Application Data

(63) Continuation-in-part of application No. 08/631,364, filed on Apr. 12, 1996, now Pat. No. 6,059,188, which is a continuation-in-part of application No. 08/506,574, filed on Jul. 25, 1995, now Pat. No. 6,102,294, and a continuation-in-part of application No. 08/394,813, filed on Feb. 27, 1995, now abandoned, which is a continuation of application No. 08/141,342, filed on Oct. 25, 1993, now abandoned.

(51) Int. Cl.
*G06K 7/10* (2006.01)
(52) U.S. Cl. .............. 235/462.01; 235/472.01
(58) Field of Classification Search ................
235/462.01–462.47, 472.01, 472.02, 472.03, 235/454, 455, 470
See application file for complete search history.

(56) References Cited

U.S. PATENT DOCUMENTS

| | | | |
|---|---|---|---|
| 5,555,125 A * | 9/1996 | Peng ........................ 359/203 |
| 5,587,577 A * | 12/1996 | Schultz .................. 235/462.44 |
| 6,024,283 A * | 2/2000 | Campanelli et al. ..... 235/462.32 |
| 6,059,188 A * | 5/2000 | diFazio et al. .......... 235/462.36 |
| 6,062,476 A * | 5/2000 | Stern et al. ............. 235/462.35 |
| 6,155,490 A * | 12/2000 | Ackley .................. 235/472.01 |
| 6,257,491 B1 * | 7/2001 | Tan et al. ................ 235/462.36 |
| 2002/0054188 A1 * | 5/2002 | Sharma et al. ................. 347/51 |
| 2002/0125324 A1 * | 9/2002 | Yavid et al. ............ 235/462.45 |
| 2004/0031856 A1 * | 2/2004 | Atsmon et al. ............... 235/492 |

OTHER PUBLICATIONS

Ikeda et al., "Two dimensional miniature optical-scanning sensor with silicon micromachined scanning mirror", SPIE 3008, 111.*
Kiang et al., Micromachined microscanners for optical scanning, SPIE 3008,82 (1997).*

* cited by examiner

*Primary Examiner*—Thien M Le
(74) *Attorney, Agent, or Firm*—Kirschstein, et al.

(57) ABSTRACT

A bar code scanning device, system and method that utilizes one or more vertical cavity surface emitting laser diodes for producing at least one laser beam, where the vertical cavity surface emitting laser diodes are disposed on a substrate, and wherein the produced laser beam is substantially an essential single spatial mode laser beam. The bar code scanning device, system and method of present invention also comprise a photodiode attached to the substrate and arranged to receive at least a portion of the beam of light reflected off the scanned bar code or symbol.

23 Claims, 31 Drawing Sheets

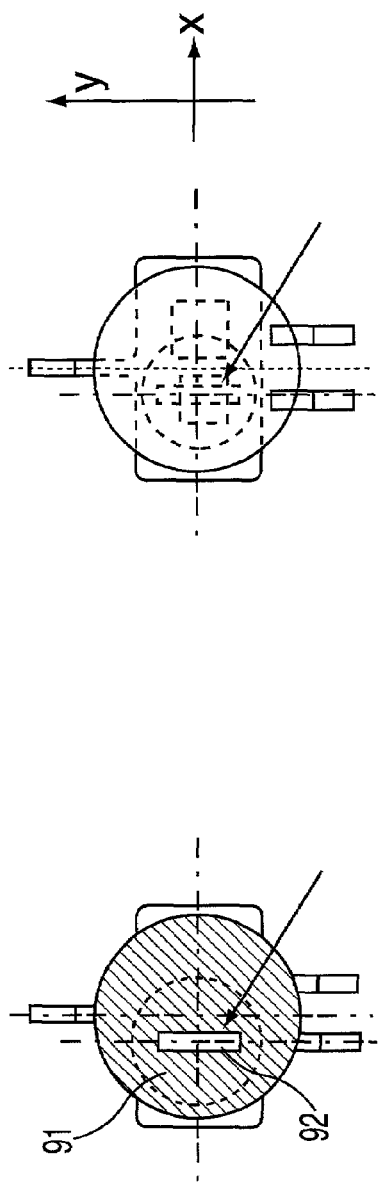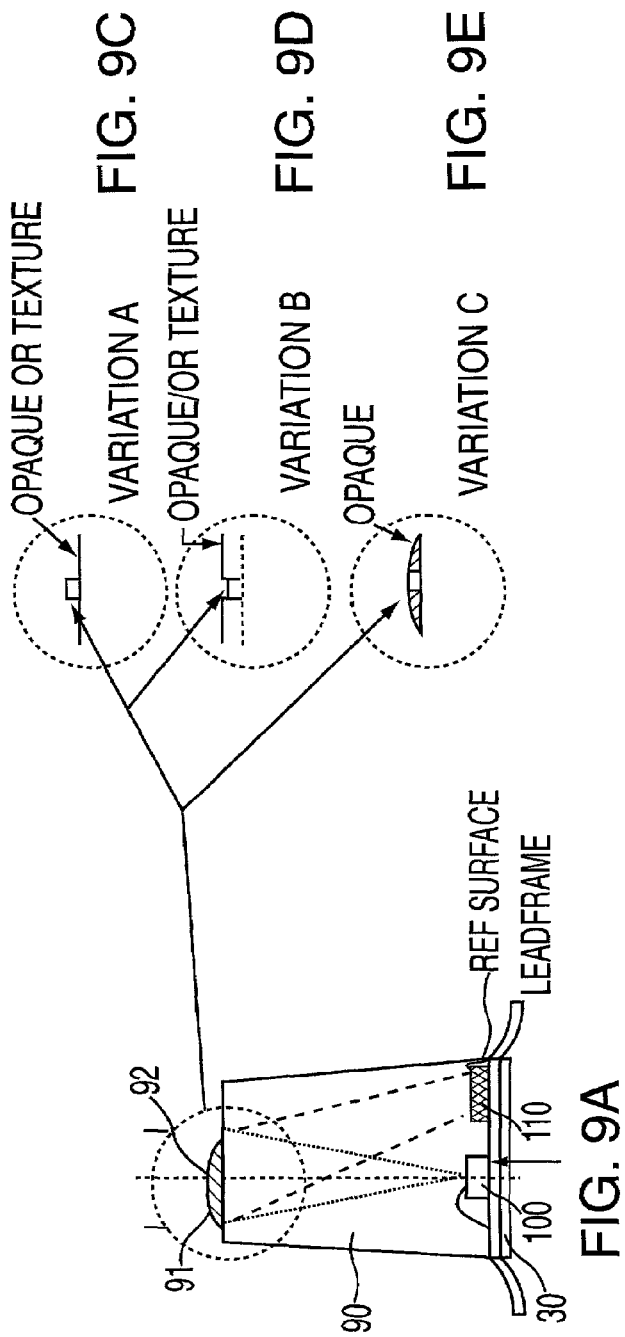

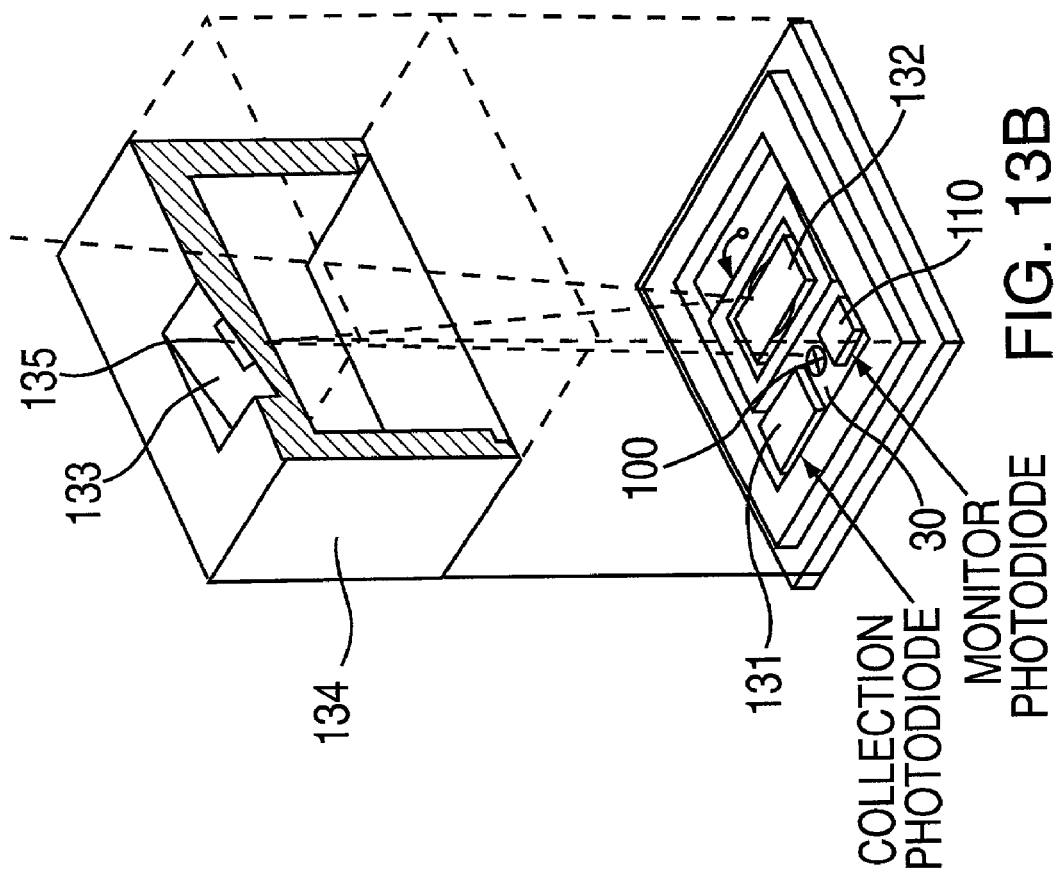
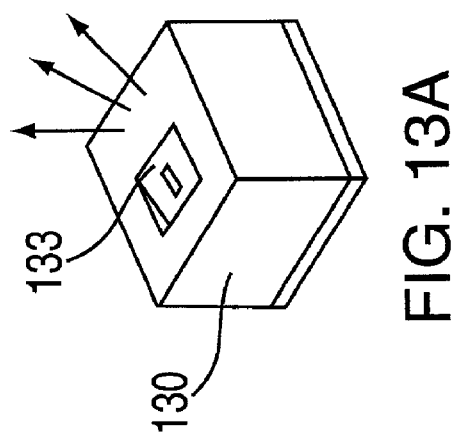
FIG. 13A
FIG. 13B

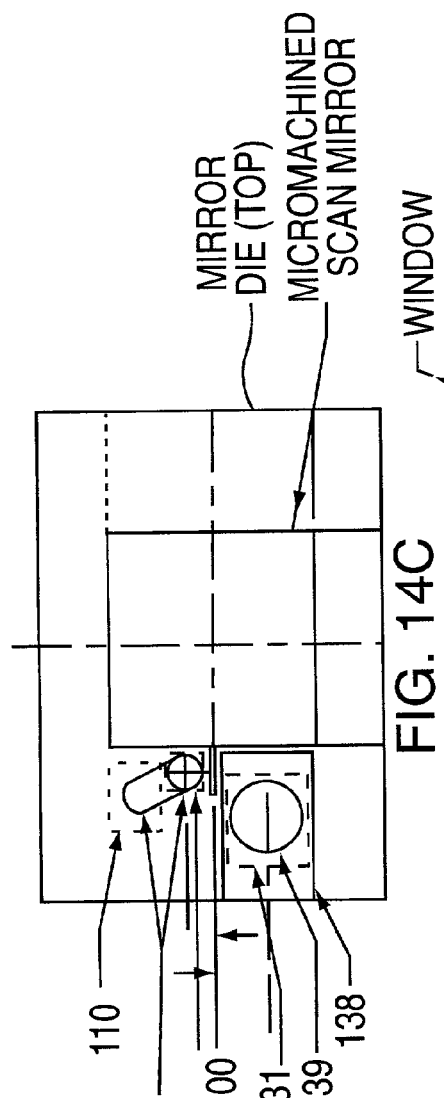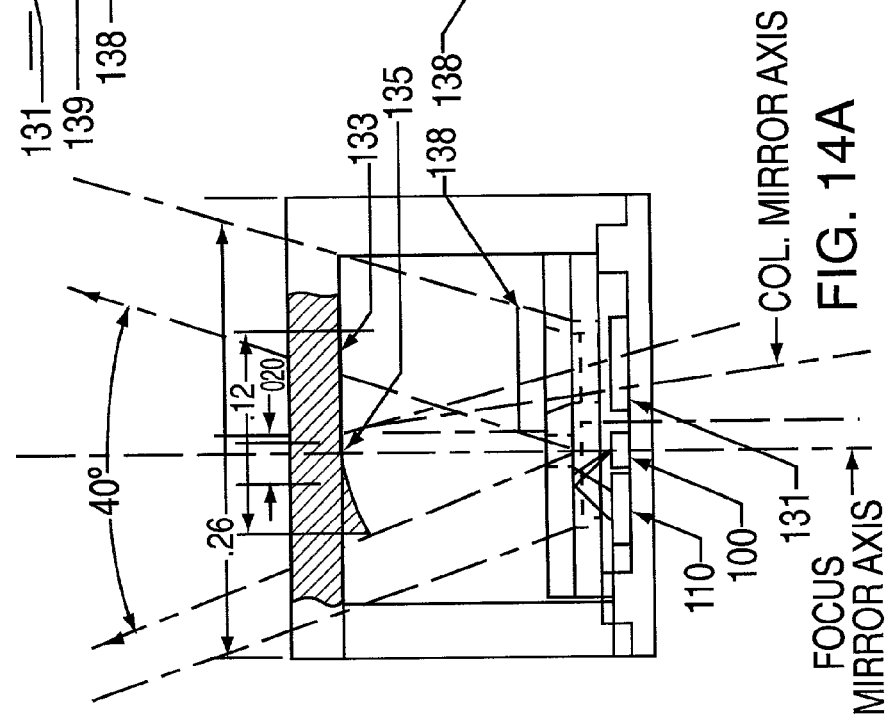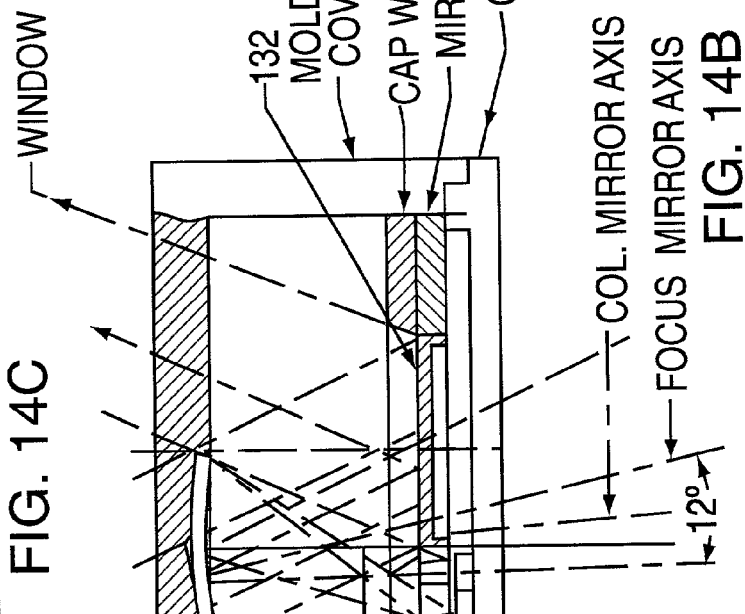
FIG. 14A
FIG. 14B
FIG. 14C

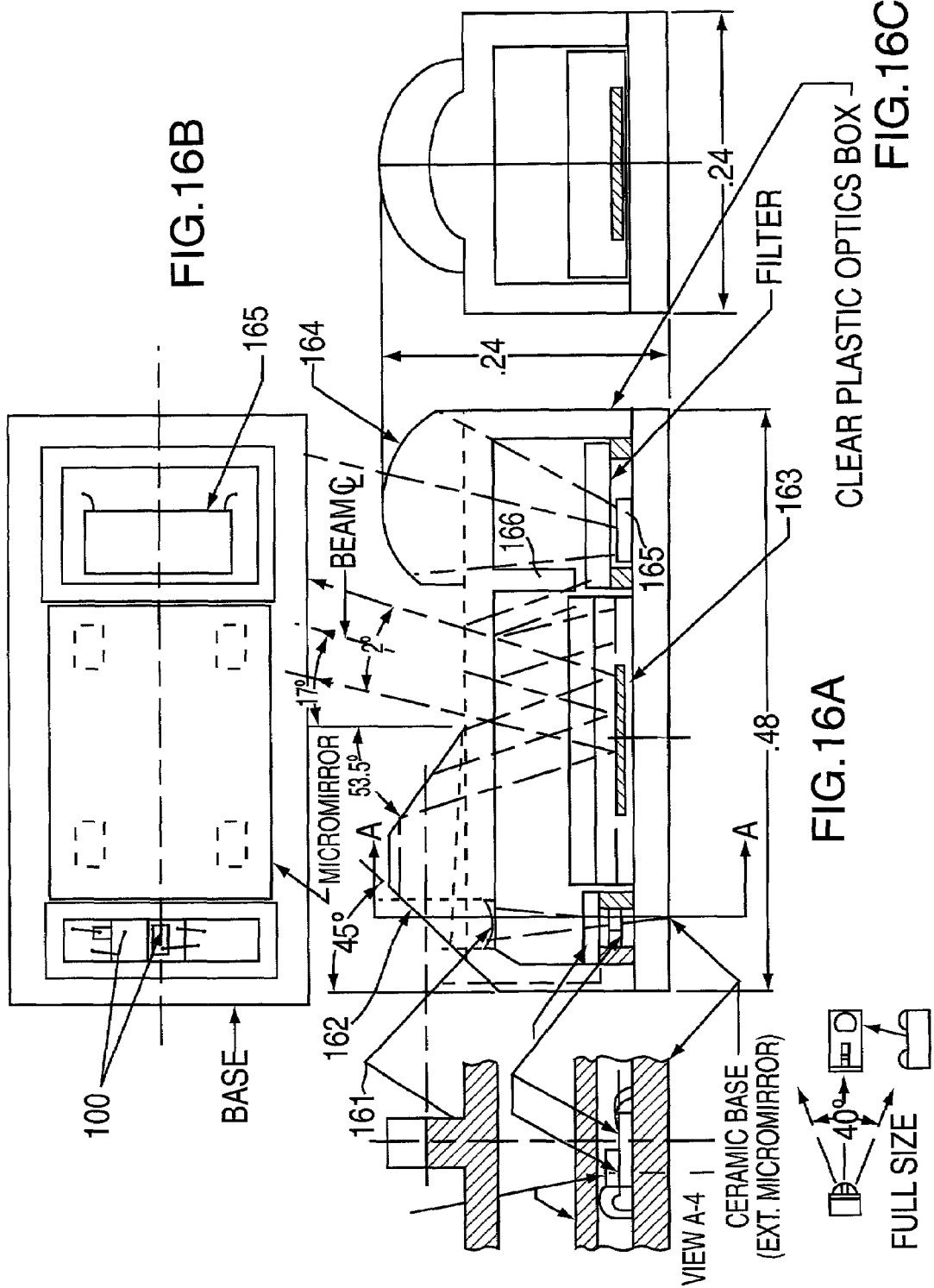

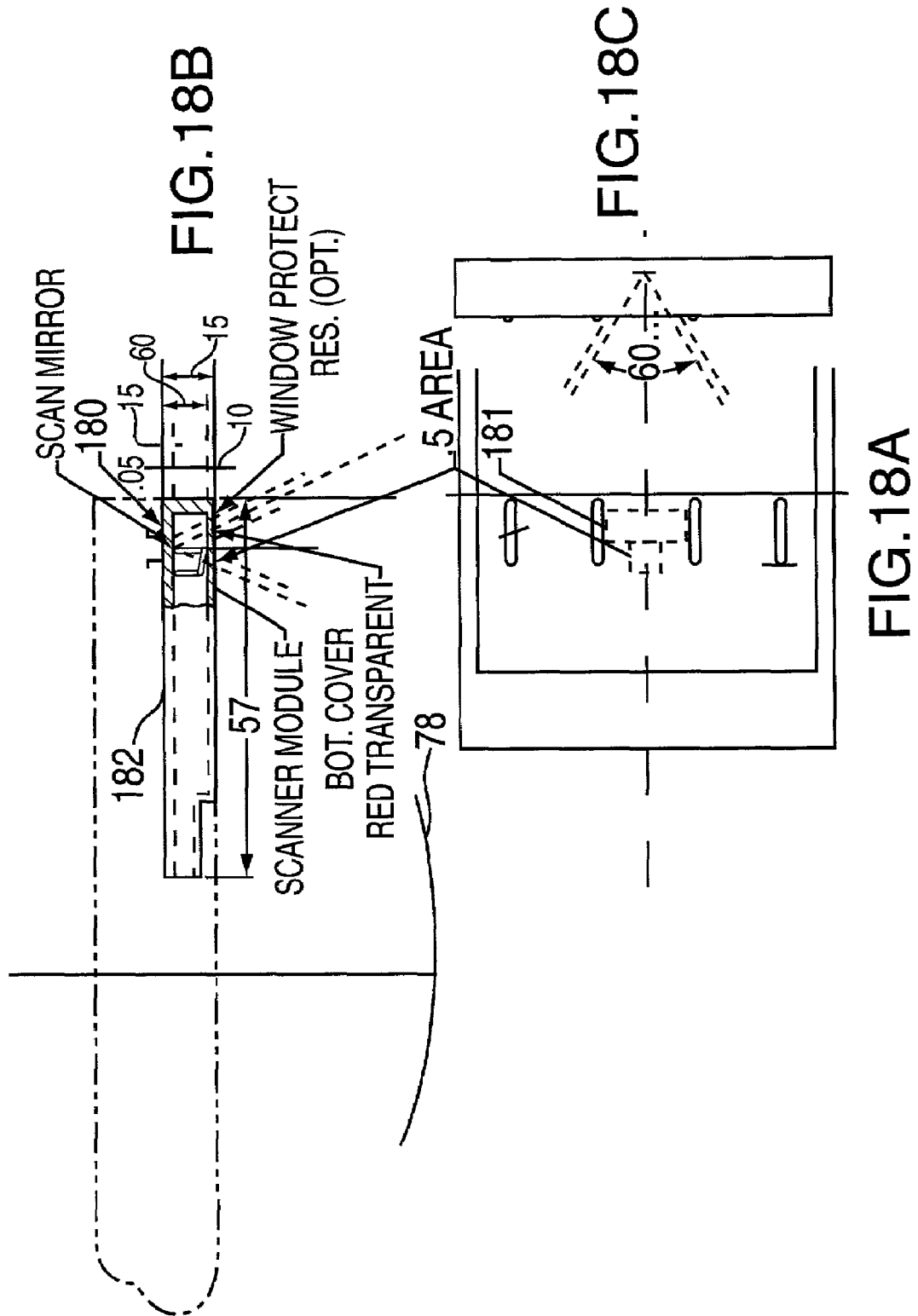

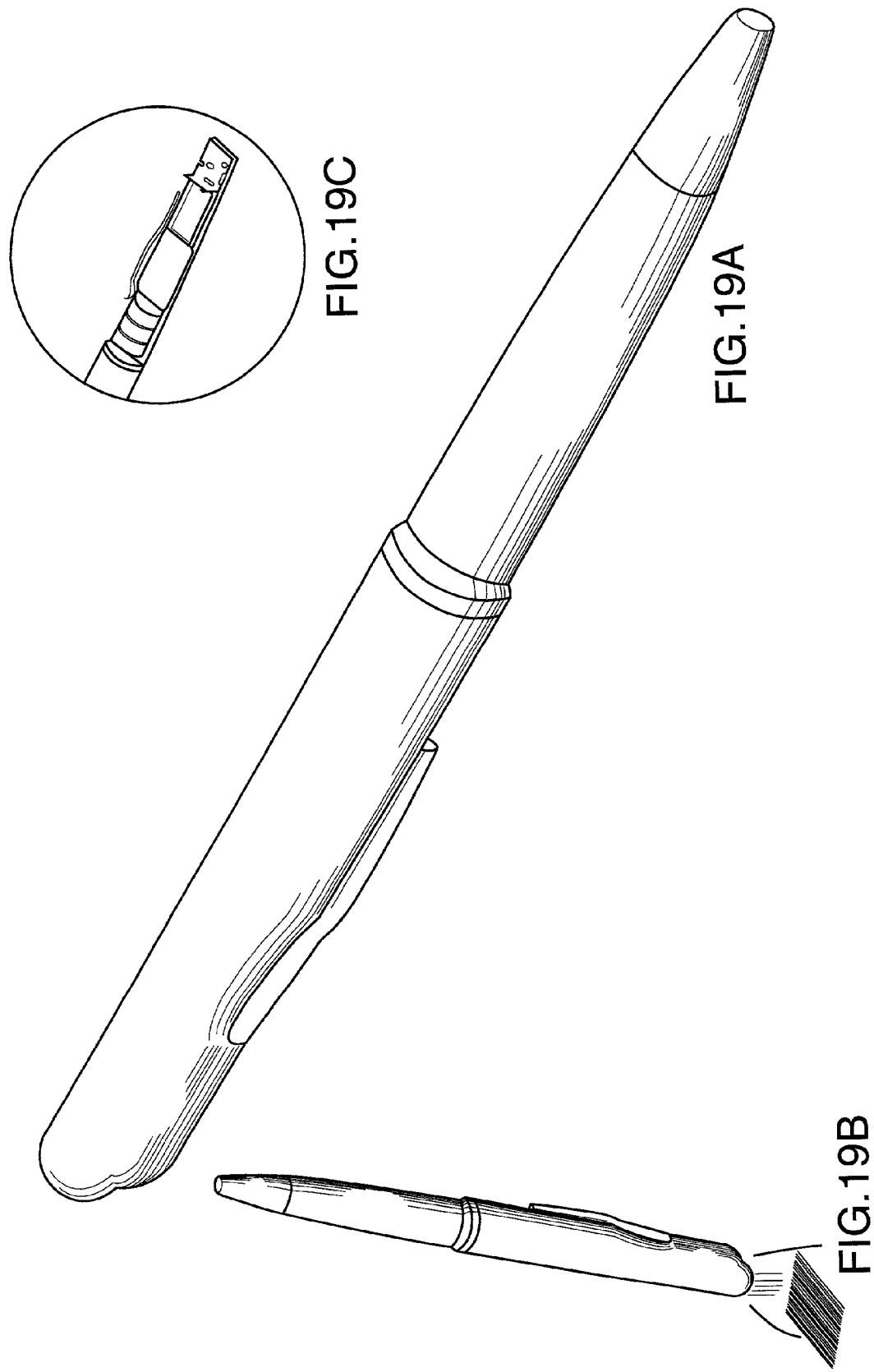

SECOND DIODE TO MONITOR TEMP

SCANNING DEVICES AND METHODS USING SURFACE EMITTING LASER DIODES

This application is a continuation-in-part of U.S. application Ser. No. 08/631,364, filed Apr. 12, 1996, U.S. Pat. No. 6,059,188, which is a continuation-in-part of U.S. application Ser. No. 08/506,574, filed Jul. 25, 1995, U.S. Pat. No. 6,102, 294, which is a continuation of U.S. application Ser. No. 08/141,342, filed Oct. 25, 1993, abandoned, and a continuation-in-part of U.S. application Ser. No. 08/394,813, filed Feb. 27, 1995, abandoned, all of which are owned by the same assignee as the present application and the disclosure of which is hereby incorporated herein by reference.

BACKGROUND OF THE INVENTION

This application relates to portable electronic devices and non-electronic articles, and more particularly to a bar code scanner and communications module for use with such devices and articles.

Various optical readers and scanning systems have been developed for reading bar code symbols appearing on a label or surface of an article, generally, a bar code symbol is a dataform having a coded pattern of indicia comprising a series of bars of various widths separated by spaces of various widths and the bars and spaces having differing light reflecting characteristics. The bar code scanning system electro-optically transforms the graphic indicia of the data form into electrical signals and decodes these signals into alphanumeric characters that provide some information about the article. The alphanumeric characters are represented by digital data which is used as an input to processing systems associated with applications, such as point of sale and inventory control systems. Scanning systems of this general type are well known in the art and have been disclosed, for example, in U.S. Pat. Nos. 4,387,297, 4,409,470 and 4,460,120, all assigned to the assignee of the present application.

A scanning system of this type generally includes a hand held laser scanner configured to enable a user to aim it a bar code pattern and emit a beam of light. The light beam is optically modified to form a beam spot of a certain size at a target distance. The bar code scanning system also typically includes a sensor, such as a photodetector, that detects light reflected back from the bar code pattern. The photodetector can be positioned in the scanner such that it has a field of view which extends across and slightly past a symbol within the pattern and a portion of the light that is reflected off the symbol is acquired and converted into an electrical signal. A bar code scanning system of this type can be either retroreflective, that is, the outgoing light and the incoming light share a common path with regard to a scanning element, or non-retroreflective.

After the reflected light is converted into an electrical signal, signal processing circuitry or software converts the electrical signal into a digital representation of the data contained in the bar code. This data is then decoded into a desired format.

Currently, many portable electronic products, such as personal digital systems, cellular telephones, computer terminals, do not have bar code scanners included as one of their peripheral devices. Moreover, non-electronic products, such as writing instruments, rings and the like do not include bar code scanners as an integral part thereof. The reason for this is lack of space on such devices for an independent bar code scanning module. If, however, a bar code scanner could be integrated along side existing peripheral circuitry or integrated within a device without substantial size or weight thereto, the functionality of the portable electronic device or portable article could be advantageously increased.

It would therefore be desirable to provide an integrated communication and bar code scanning module for portable electronic devices and portable articles.

SUMMARY OF THE INVENTION

It is therefore one objective of the present invention to provide an integrated communication and bar code scanning module for portable electronic devices and portable articles.

This and other objectives of the present invention are accomplished by the present invention wherein a scanner comprises at least one surface emitting laser diode on a substrate for producing a laser beam, beam shaping for shaping the beam and wherein the shaped beam is substantially an essential single spatial mode laser beam, or where the single spatial mode is the fundamental spatial mode.

The surface emitting laser diode is preferably a vertical cavity surface emitting laser (VCSEL) which is a type of laser diode that emits light vertically from the top surface of a chip. VCSELs have many advantages over conventional edge emitting laser diodes. They have well controlled beam characteristics, can be tested on the wafer scale, are easy to package and have inherently lower costs and consume four to five times less power than edge emitting laser diodes. It is also possible to create multiple VCSELs on one single chip.

A typical size of a VCSEL chip is a few hundred microns so that it can be handled, but the dimension of the actual surface emitting laser is 10 to 20 microns. Since the cost of producing a chip is largely determined by its size, it is cost effective to produce multiple VCSELs on one chip. In addition, incorporating VCSELs as a light source into the scanning module in accordance with the invention allows miniaturization of the scanner module to less than 5 mm in height, and reduction of the scanner's volume to about 1 cubic inch or less.

In a typical flying-spot laser bar code scanner, consisting of an oscillating mirror that scans a focused laser, and where the direction of the incident laser beam and the rotation axis of the scanning mirror are not perpendicular to each other, the mirror sweeps out a curved line on a flat bar code target. The resulting curved scan line is known as the "smiley" effect and the degree of curving is dependent on the angle of incidence of the laser beam to the scan mirror. The more oblique is the out-of-plane incident angle from the laser to the scan mirror, the more profound is the curve. Besides aesthetic reason, a curved line makes reading of two-dimensional and short (or truncated) one-dimensional bar codes difficult or impossible. Accordingly, one objective of the invention is to provide an optical arrangement that eliminates or reduces the curvature of the "smiley" line by inserting a conical section in the scanned laser path. The effect of the inserted conical section is to match the curvature of the curved scan line and to tilt the laser beam when it leaves the conical section so that its final direction is perpendicular to the rotating axis of the scanning mirror.

Another objective of the invention is to provide an optical arrangement that utilizes a tilted conical mirror with a curvature to eliminate or reduce the curvature of the "smiley" line.

A further objective of the invention is to provide an optical arrangement that eliminates or reduces the curvature of the "smiley" line and reduces thickness of the conical element by utilizing a very coarse conical Fresnel optical surface instead of a bulk conical surface.

These and other objectives, characteristic and advantages of the present invention will be disclosed in more detail with reference to the attached drawings.

BRIEF DESCRIPTION OF THE DRAWINGS

FIGS. 9A-9E are further embodiments of a scanner subassembly according to the invention;

FIGS. 13A-13B is another embodiment of a scanner subassembly according to the invention;

FIGS. 14A-14C is a further embodiment of a scanner subassembly according to the invention;

FIGS. 16A-16C is another embodiment of a scanner subassembly according to the invention;

FIGS. 18A-18C show a scanner in an interface card in accordance with the invention; and FIGS. 19A-19C show a pen with a scanner in accordance with the invention.

DETAILED DESCRIPTION OF THE INVENTION

Figure 1:
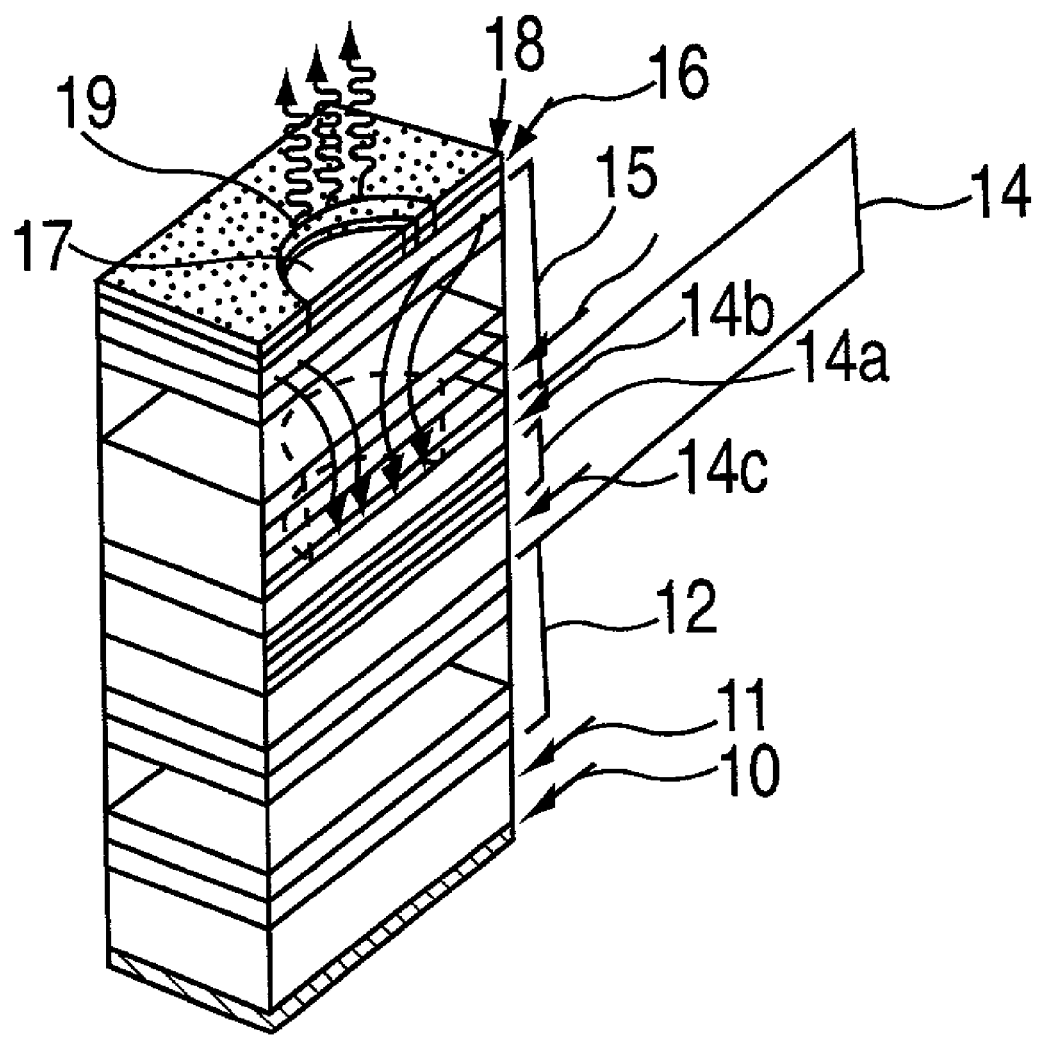
FIG. 1 is a sectional view of a vertical cavity top surface emitting laser used in accordance with the invention.

FIG. 1 shows the cross section (not to scale) of the epitaxial layer structure of a VCSEL for use in the present invention. The VCSEL structure consists essentially of a top and bottom quarter-wave mirror stack (also known as Bragg reflector) surrounding a spacer region (usually a material wavelength thick) containing the active quantum wells at its center (located at the peak optical-field anti-node for increased simulated emission efficiency). Referring to FIG. 1, the VCSEL structure comprises the n-contact 10 and the n-doped bottom mirror stack 12, separated by the GaAs substrate layer 11. The VCSEL structure further comprises the p-mirror stack 15 and the p-contact 16, separated from the n-mirror stack 12 by the spacer 14, which consists of the undoped active GaAs quantum wells 14a enclosed by the top confinement layer 14b and the bottom confinement layer 14c. The p-contact 16 has an opening 17 for emitting the laser beam from the device. In accordance with the present invention, an optional aperture layer 18 having an aperture 19 is formed on the p-contact layer to provide an output beam which is shaped for the function of the diode and which is preferably a single spatial mode laser beam for bar code scanning applications. Alternatively, the bottom n-contact 10 substrate may have an opening and provide an output beam.

Figure 2:
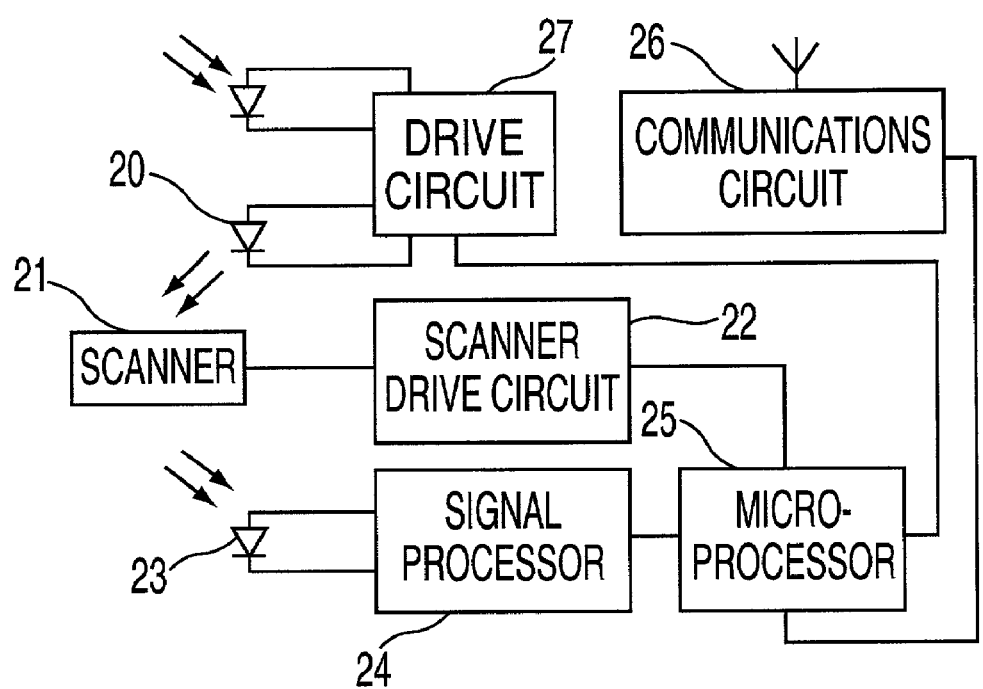
FIG. 2 is a schematic diagram of a scanning system according to the invention.

FIG. 2 shows a schematic diagram of a scanning device utilizing a surface emitting laser diode on a substrate in accordance with the present invention.

The surface emitting laser diode 20 emits light which is scanned by a scanning element 21 which can be a mirror or other scan element which is driven by a scanner drive circuit 22. Light reflected from a bar code B is received by a photodetector 23 either by means of the scanner 21 in a retroreflective system, or directly from the bar code in a non-retroreflective system. The output from the photodetector 23 is received by a signal processor 24 and digitized and thereafter applied to a microprocessor 25 which further processes the signal by decoding same. The decoded output is then communicated externally of the device via communications circuit 26 which is preferably a wireless communications circuit which is capable of communicating the data via WAN, LAN, Bluetooth, cellular transmission, etc.

The surface emitting laser diode 20 is driven by the drive circuit 27, which is controlled by the microprocessor 25 to apply a current to the diode 20 so as to limit the output power and to ensure that it emits substantially an essential single spatial mode laser beam. Alternatively, the single spatial mode may be the fundamental spatial mode of the emitted laser beam. As part of the drive circuit 27, the photodetector 28 is provided to receive a portion of the light emitted by the diode 20. The drive circuit 27 may use that as a feedback signal for further control of the diode 20. It should be noted that while the feedback control described above is preferred, it is not strictly necessary and many embodiments of the current invention that utilize VCSELS over a limited temperature range may operate without it.

In addition, instead of using a feedback photodetector to control drive current to the surface emitting laser diode, a scanner built in accordance with the invention may utilize a temperature, which would estimate the required current to be supplied to the surface emitting laser diode based on the sensed temperature readings or fluctuations. Since VCSELs typically do not suffer burn-outs from excessive current, it is possible to build a functional feedback circuit for a scanner utilizing VCSELs in accordance with the invention based on the imprecise or estimated values of the supplied current, which are derived from the readings of the temperature sensor.

VCSEL Drive Current as a Function of Temperature

Figure 32A:
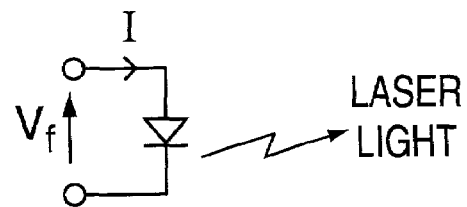
FIG. 32a shows a simplified circuit diagram of an embodiment of the current invention that utilizes VCSEL diode as a temperature sensor.
Figure 32B:
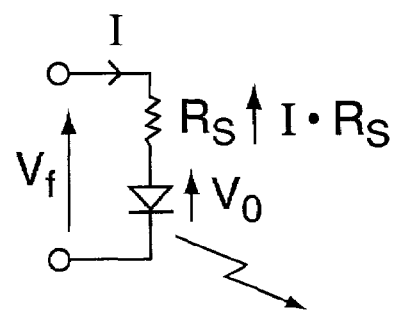
FIG. 32b shows a simplified circuit diagram of another embodiment of the current invention that utilizes VCSEL diode as a temperature sensor, with parasitic resistor (Rs).
Figure 32C:
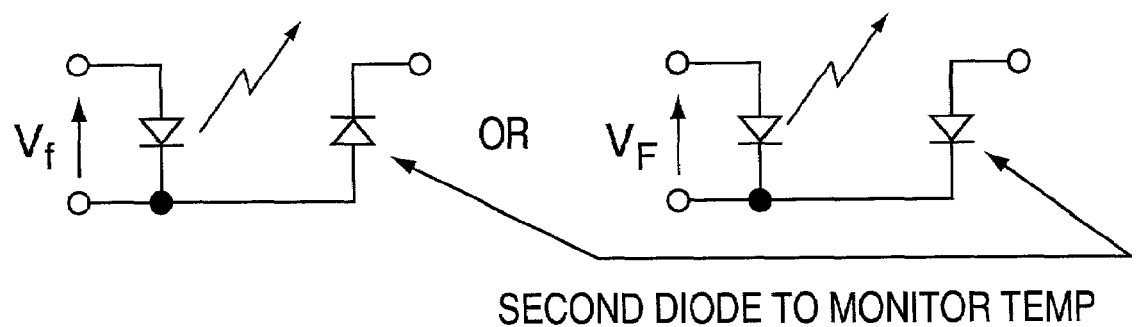
FIG. 32c shows a simplified circuit diagram of a preferred embodiment of the current invention that utilizes a second (non-lasing) diode on the same substrate to monitor temperature and better estimate the required drive current supplied to the laser emitting diode in order to regulate the optical power.

Referring to FIGS. 32*a*, 32*b* and 32*c*, showing the circuit diagram of various embodiments of the current invention that utilizes VCSEL diode as a temperature sensor, the optical power ($P_o$) out of a VCSEL is a function of temperature (T), drive current (I), and its forward voltage drop (Vf), i.e., $P_o$=f(T, I, Vf). In accordance with the invention, as described below, the VCSEL itself can be used as a temperature sensor, to estimate its own temperature T.

The VCSEL is basically a semiconductor LASER diode, and as such can be modeled as a diode, as shown in FIG. 32*a*. The parasitic resistor (Rs), shown in FIG. 32*b*, is an integral part of the VCSEL diode and can be used to monitor the changes and variations in temperature. Alternatively, a series resistor (i.e., either a discrete resistor or a resistor manufactured on VCSEL substrate) may be connected with the VCSEL diode and used to monitor changes in temperature. The following equations for the circuit shown in FIG. 32*b* demonstrate that both parasitic resistor Rs (or a series resistor connected to VCSEL diode in series, not shown) and the more "ideal" diode (less its resistance) have temperature dependencies.

$$Rs=Rs_0(1+TC1(T-T_0))$$

where TC1 is temperature coefficient (1/°K);

$$I_{diode}=I_d=I_{d'}\approx I_0(e^{Vd/nVt});$$

$$I_0\approx K*T^m \quad (e^{-Vgo/nVt})$$

where T is temperature in degrees Kelvin;

K is constant;

Vd is diode voltage;

$V_{go}$ is a voltage which is numerically equal to the forbidden-gap energy $E_{go}$;

n is a multiplying factor, which depends on the material used and the current; for example:

for Silicon (Si) diodes: n=2, m=1.5 and $V_{go}$=1.21V for Germanuim (Ge) diodes: n=1, m=2 and $V_{go}$=0.785V $T_0$ is temperature at a reference point;

Vt is the volt equivalent of temperature=T/11,600

If the VCSEL is driven with current I, the forward voltage drop is Vf=I*Rs+Vd. From the equations it can be seen that Vf is now dependent on the drive current I and temperature T. Since we know the current I we can estimate temperature T from the forward voltage drop Vf. Knowing temperature and properties of the VCSEL ($P_o$=f(T, I, Vf)) we know what drive current is needed to achieve a desired optical power based on its Vf. The properties of the VCSEL can be either derived analytically or empirical measurements in a temperature chamber.

The following are several examples of determining drive current:

Drive a current $I_1$, which is less than the lasing threshold current and measure $Vf_1$.

Drive a current $I_2$ based on the $Vf_1$ observation and measure $Vf_2$.

Drive a current $I_3$ based on the $Vf_1$ and $Vf_2$ observations.

In addition, an equation and/or look-up table could be used to convert the present drive current and Vf into the next drive current. Multiple observations are not necessary, but allow calculation of ($Vf_2$-$Vf_1$). This has the advantages that offset voltage error in the observer drops out and some of the "assumed" constants in the equations drop out. Hence final drive current is I=f(T, $I_1$, $Vf_1$, $I_2$, $Vf_2$).

In one preferred (modified) embodiment of the invention, a circuit diagram of which is shown in FIG. 32*c* requires a second (non-lasing) diode that is preferably manufactured on the same die as the lasing VCSEL diode (i.e., the first VCSEL). This second diode will have similar electrical characteristics as the first VCSEL. Because of that, the second (non-lasing) diode could be used as a monitor diode to sense temperature of the first lasing VCSEL diode. The second diode could share a common anode or cathode with the VCSEL. A parasitic resistor of the second diode, or a series resistor connected to the second diode in series (which could either be used by itself or in combination with a parasitic resistor), may be utilized to facilitate temperature sensing and improve the estimate of temperature, and hence determine the required drive current for a desired $P_o$.

Surface emitting laser diodes mounted on a substrate provide for a great deal of flexibility in the construction of scanning devices, as can be seen hereinafter with regard to the description of FIGS. 3-11.

In particular, vertical cavity surface emitting lasers are desirable due to low operating power, aperture control, and wafer level testing. A number of the following embodiments can be used to provide focusing without the need for active focusing.

Figure 31:
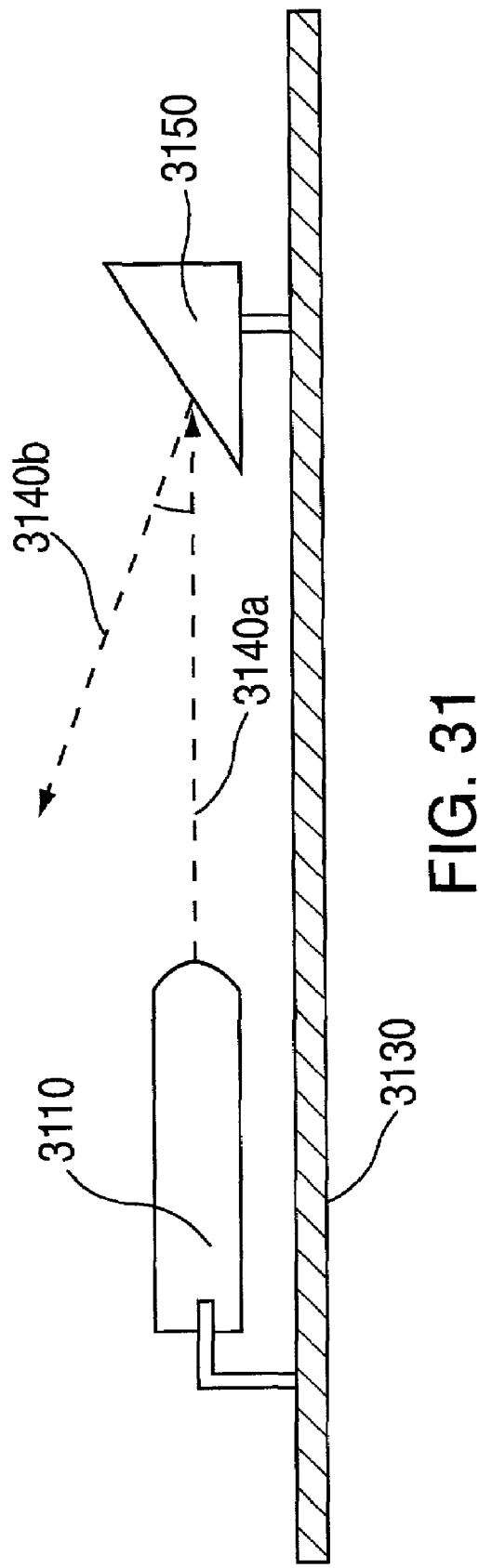
FIG. 31 shows an embodiment of a scanner subassembly according to the invention, which utilizes an edge-emitting laser diode and a mirror instead of a VCSEL as a light source.

While it is preferable and more efficient to use vertical cavity surface emitting VCSELs as a light source in the scanner assemblies and different scanner embodiments described below, it is also possible to produce a similar effect using one or more edge-emitting laser diodes and a reflective optical element, as for example a mirror, as the light source. For example, as shown in FIG. 31, an edge-emitting laser diode 3110 may be mounted on a circuit board 3130 on its side, and transmit a light beam to the mirror 3150 along the path 3140a. The mirror may then re-direct it outward (or toward another reflective element) along a different path 3140b, at some angle to the path 3140a.

Figure 3:
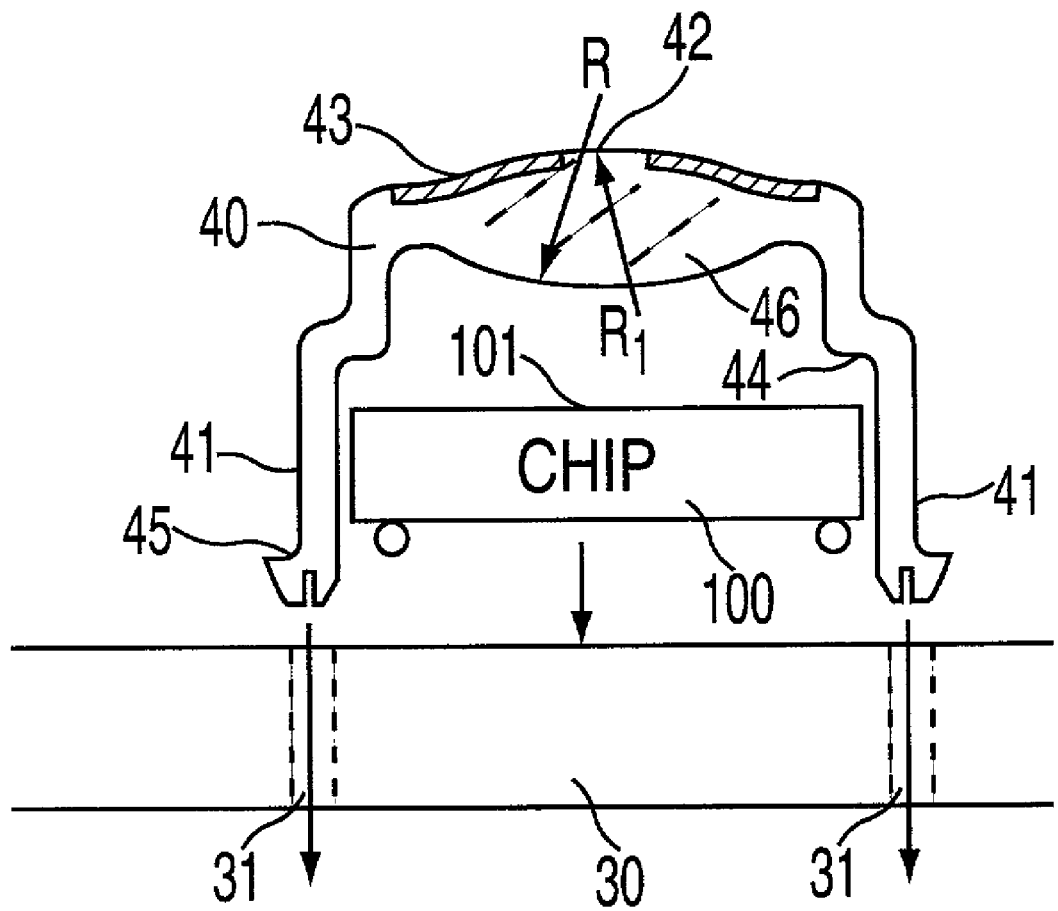
FIG. 3 is one embodiment of a scanner subassembly according to the invention.

VCSELs are tested on a wafer, separated into dice and mounted on a lead frame. The packaged VCSEL is then mounted by conventional surface mounting or flip chip techniques to a substrate or circuit board. FIGS. 3 and 4 A-C show a low cost molded plastic lens and a precision stop and clips. Specifically, the mounting of the VCSEL chip 100 on the substrate 30 having mounting holes 31 therein is carried out by the mounting member assembly 40, preferably made of plastic, which comprise the mounting clips 41, having the outer stop surfaces 45 and the inner stop surface 44, the latter contacting the top surface 101 of the chip 100 when the chip is mounted. The mounting member 40 also includes beam shaping optics which comprises a lens 46 which is a molded plastic lens and which has an opaque mask 43 on the top thereof, forming an aperture 42 for a beam to be emitted from the chip 101.

The inner stop surface 44, when in contact with the VCSEL chip 100 sets a specific lens to VCSEL separation. The legs or clips 41 go through the mounting holes 31 in the substrate and lock the lens in place. The surface of the lens can be designed and fabricated such that the elements in a VCSEL array can be focused to different distances and spot sizes to obtain multiple focus packages.

To control the process of non-uniformity of the lens and VCSEL, the aperture 42 can be added on the top surface of the lens by directly coating the lens or by adding an external cap. The lens 46 is preferably aspherical to convert the circular beam from the VCSEL to elliptical shape, which is preferred for 1-dimensional scanning. The lens 46 can also be spherical to maintain a round laser spot for 2-dimensional and omni scanning. In this embodiment, the lens may be either refractive or diffractive and may reside on either the upper or lower surface.

Figure 4A:
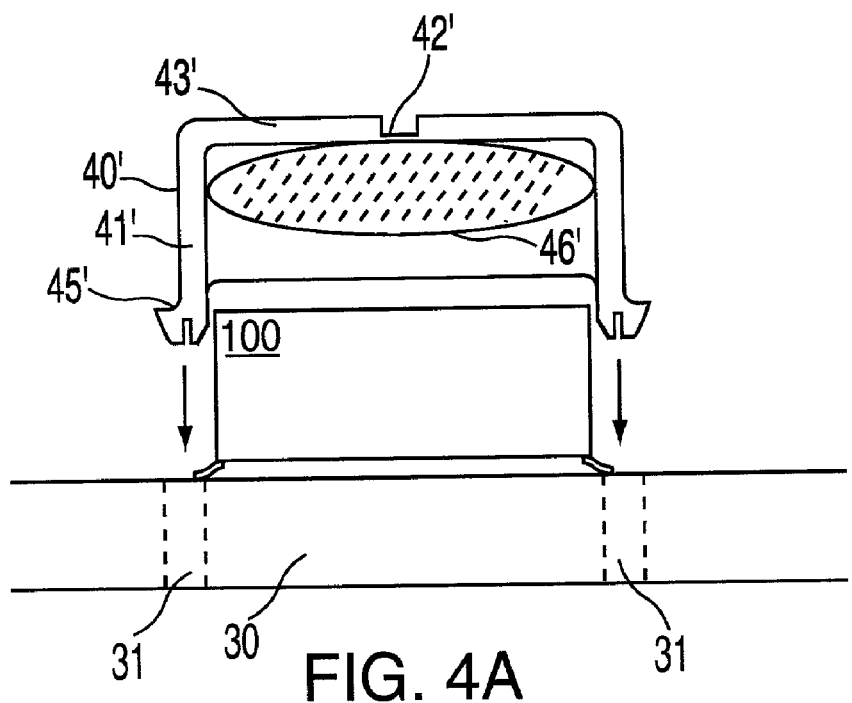
FIGS. 4A-4C is another embodiment of a scanner subassembly according to the invention.

In FIG. 4A, the VCSEL chip 100 is mounted into place on substrate 30 using standard die-attached or surface mount techniques. Beam shaping and focusing is accomplished by mounting element 40' which has legs or clips 41' with stop surface 45' to lock it into place. In this embodiment, the beam shaping optics includes a plastic lens 46' which is disposed below the top surface 43' of the mounting element and which has an aperture 42' for shaping the beam to be emitted.

Figure 4B:
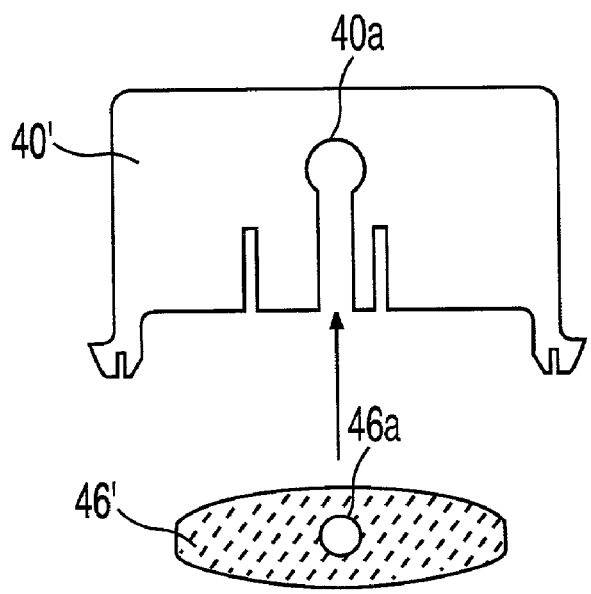
Figure 4C:
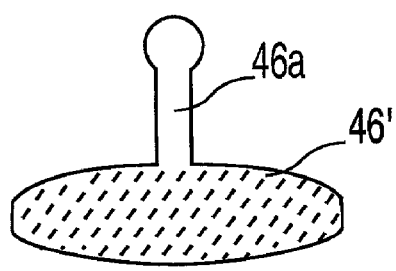

FIGS. 4B and 4C show how the lens 46' is mounted in the cap. The lens has a rod 46a that slides into the notch 40a in the cap. FIG. 4C also shows a 90° rotational view of the lens 46'.

Figure 5:
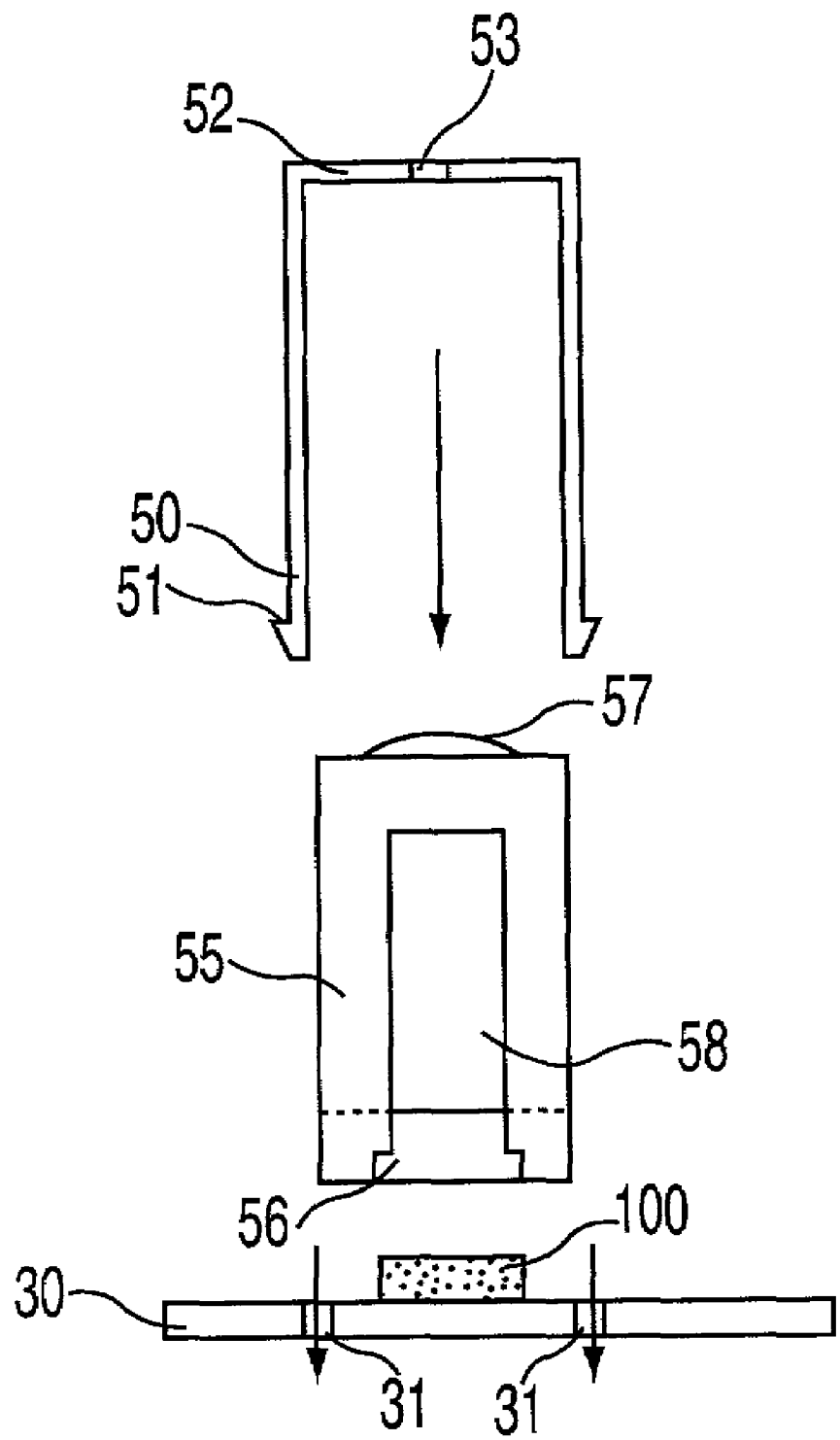
FIG. 5 a further embodiment of a scanner subassembly according to the invention.

FIG. 5 illustrates another mounting cap for a VCSEL 100. In this embodiment, the substrate 30 has the mounting holes 31 and the VCSEL 100 is mounted on the substrate using standard die-attach or surface mount techniques. A molded plastic lens 57, mounted on a mounting structure 55 that has a cutout 56 for the VCSEL and a central cavity 58, is placed over the VCSEL so as to provide a highly accurate distance between the lens 57 and the upper surface of the VCSEL 100. Alternatively, the plastic lens 57 comprises a 1-piece molded structure with the mounting structure 55. The unit is locked in place with a cap 50 having legs with locking surfaces 51 and an aperture 53.

Figure 6A:
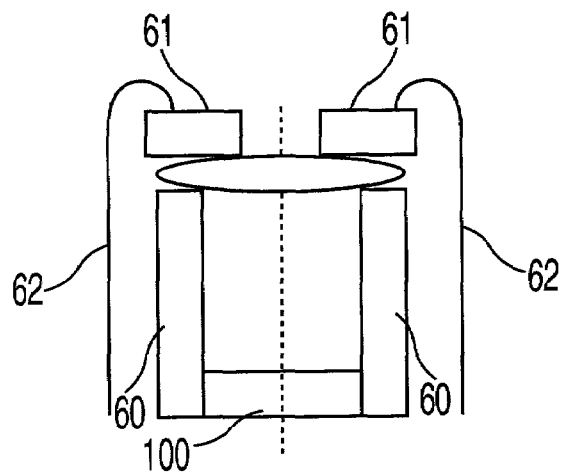
FIGS. 6A-6B is another embodiment of a scanner subassembly according to the invention.
Figure 6B:
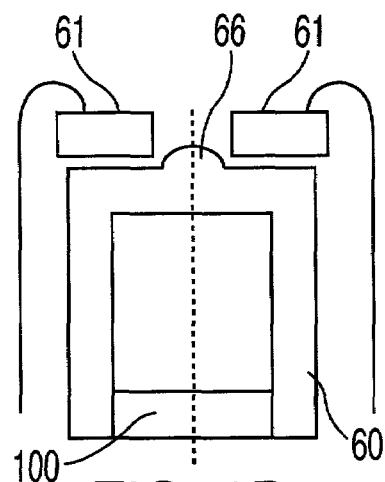

FIGS. 6A and 6B shows a molded lens and laser power monitoring photodetector which doubles as the aperture.

Figure 6C:
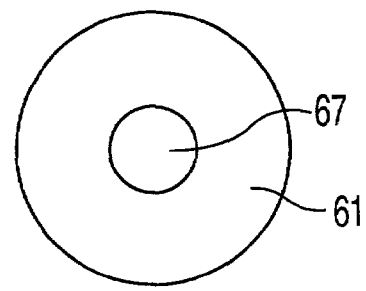

In these embodiments, the VCSEL 100 is covered with a cap 60 which has a power monitoring detector 61, shown in FIG. 6C disposed at the top thereof and thus forming the aperture 67 and receiving a portion of the light emitted by the VCSEL 100. Wire bonds 62 enable the output of the detector to be fed to the drive circuit for the VCSEL. In the embodiment shown in FIG. 6B, the cap 60 has a lens 66 which is disposed in the aperture 67 in the detector 61.

Figure 7A:
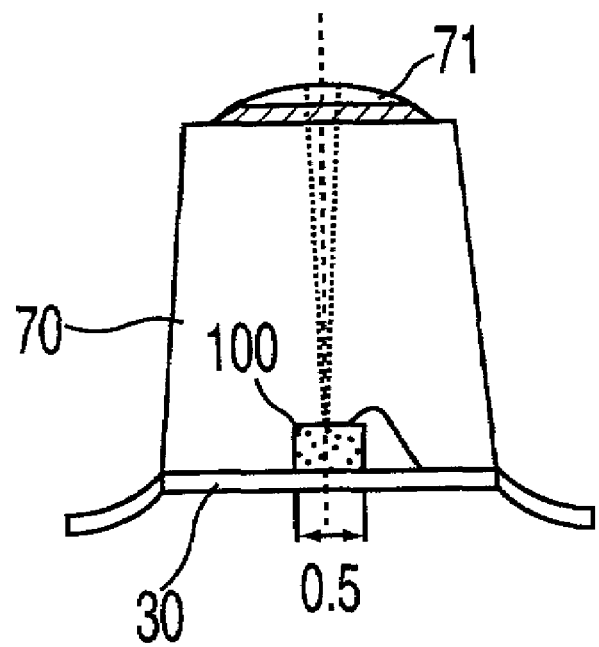
FIGS. 7A-7B is a further embodiment of a scanner subassembly according to the invention.
Figure 7B:
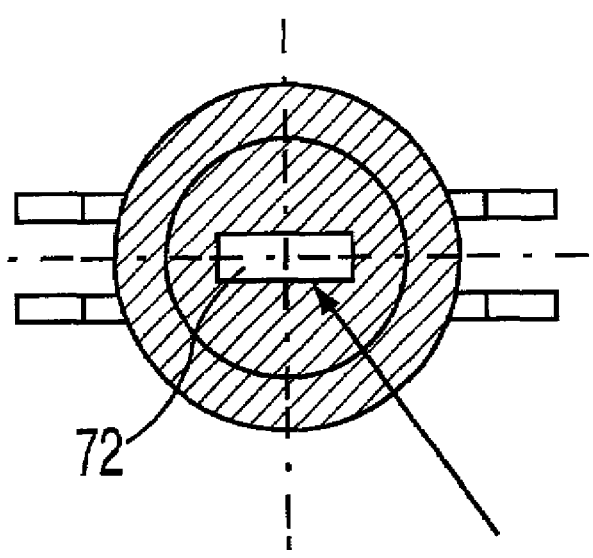
Figure 8A:
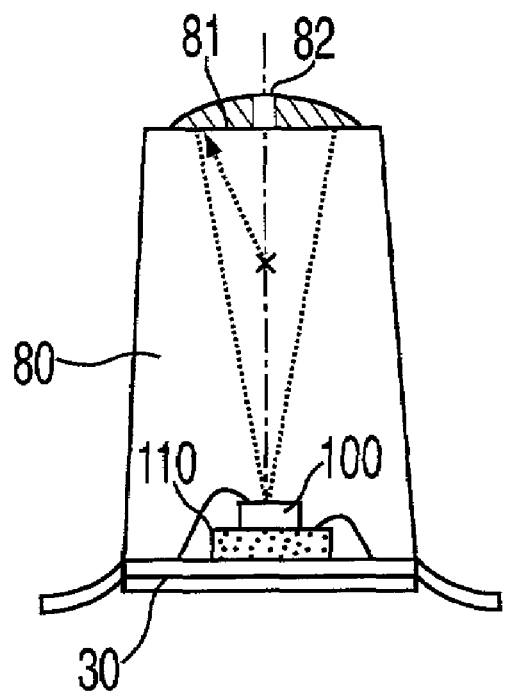
FIGS. 8A-8B is a still further embodiment of a scanner subassembly according to the invention.
Figure 8B:
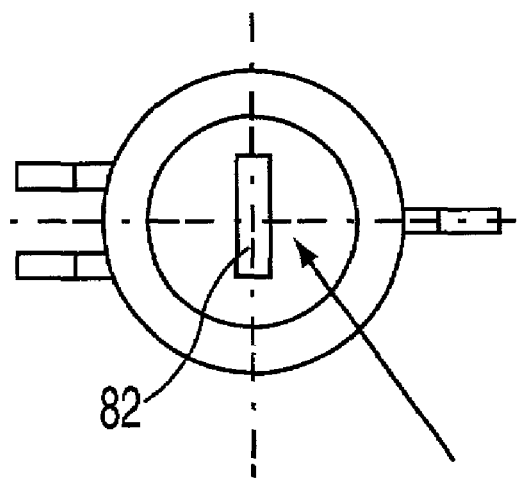

In the embodiments shown in FIGS. 7-9, the laser and the power monitoring detector can be die attached to a lead frame which is encapsulated with plastic with a lens on top. As shown in FIGS. 7A and 7B, the plastic encapsulation 70 has the lens 71 on top and the aperture 72. In FIGS. 8A and 8B, the laser is mounted on the monitoring detector 110 which can be die attached to a lead frame 30 and all of which is encapsulated with the plastic member 80, having the aperture 82 and the lens 81 on its top.

FIGS. 9A-9E show alternative embodiments of the plastic cap with lens and aperture integrally formed therein on the top, as well as different variations as to how the aperture is achieved. In these embodiments, the VCSEL 100 is on the lead frame or substrate 30 with the power monitoring detector 110 disposed nearby, both encapsulated within the plastic housing 90. The housing has the lens 91 centered over the VCSEL 100 but off center of the cap and the aperture 92 is integrated in the lens.

Alternatively, as shown in FIGS. 9C and 9d, the surface surrounding the aperture can be opaque or textured to achieve the aperture in the lens. The aperture portion 92 in the lens acts to transmit light from VCSEL 100 through it, while the area around the aperture acts to reflect it back to the detector 110. Moreover, the area around the aperture can be ellipsoidal.

Alternatively, the aperture may be formed just by having a plane plastic surface surround the embedded lens. In that case, the unfocused light scatters and only the focused light traveling through the aperture propagates any appreciable distance.

To achieve an elliptical laser spot from a circularly symmetric laser, the lens can be cylindrical or toroidal and therefore having two focal lengths.

In FIGS. 8 and 9, the laser light is scattered by the housing and aperture and is reflected back to the power monitoring detector. Furthermore, the area around the lens can have a gentle tilt to deflect the scattered light in the general direction of the monitoring detector. Alternatively, the focusing lens, limited by the aperture, can be embedded in an ellipsoidal dome, as shown in FIG. 9E with the laser and detector as its foci. The laser light collected by the dome will be reflected and concentrated to a smaller power monitoring detector.

Figure 11A:
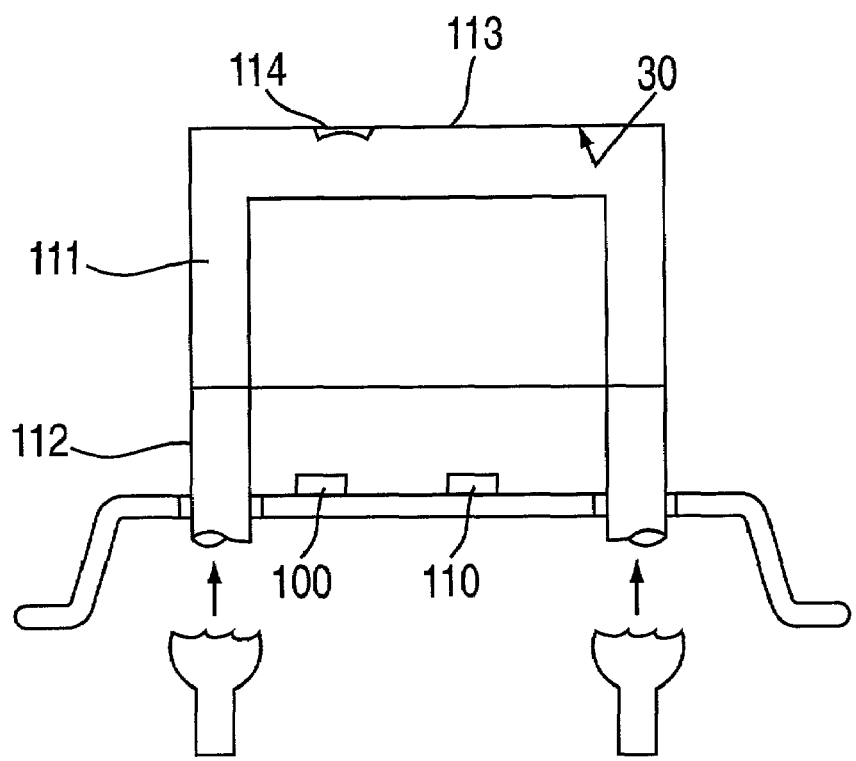
FIGS. 11A-11B is another embodiment of a scanner subassembly according to the invention.
Figure 11B:
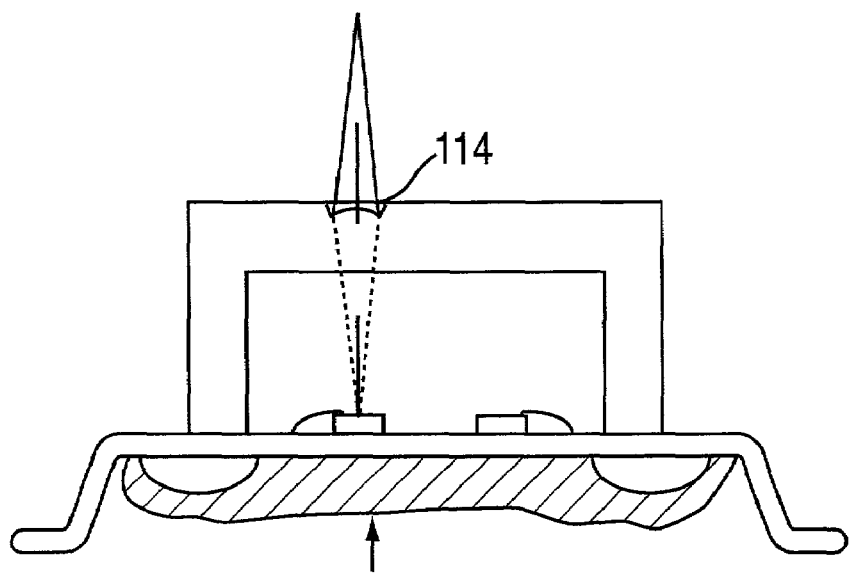

In the embodiment shown in FIG. 11A and of FIG. 11B, the plastic cap 111 has mounting feet 112 which are heat staked and/or glued after passing through mounting holes in substrate 30. The cap covers the VCSEL 100 and the detector 110 and has a reflective surface 113 at the top thereof including aperture 114 for emitting a beam. The reflective surface scatters some of the light from the VCSEL and the scattered light is then captured by the power monitoring detector 110.

Figure 12A:
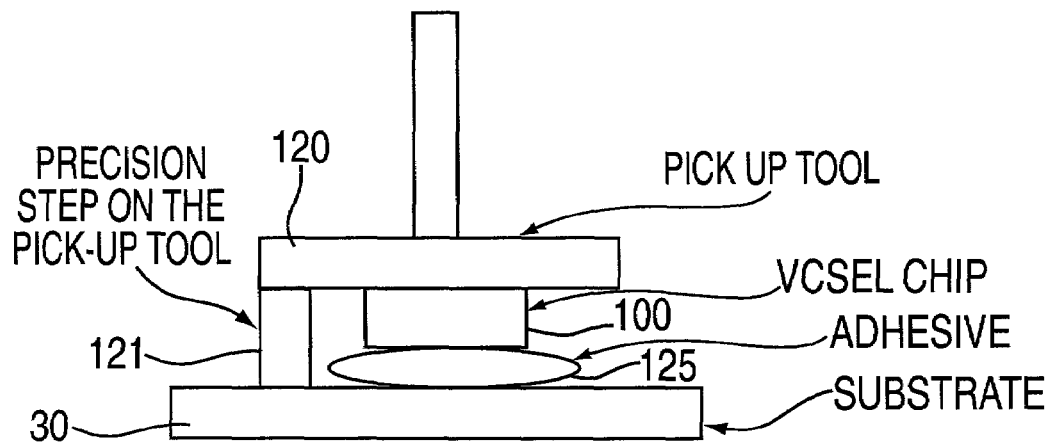
FIGS. 12A-12B show alternative methods for mounting a VCSEL according to the invention.
Figure 12B:
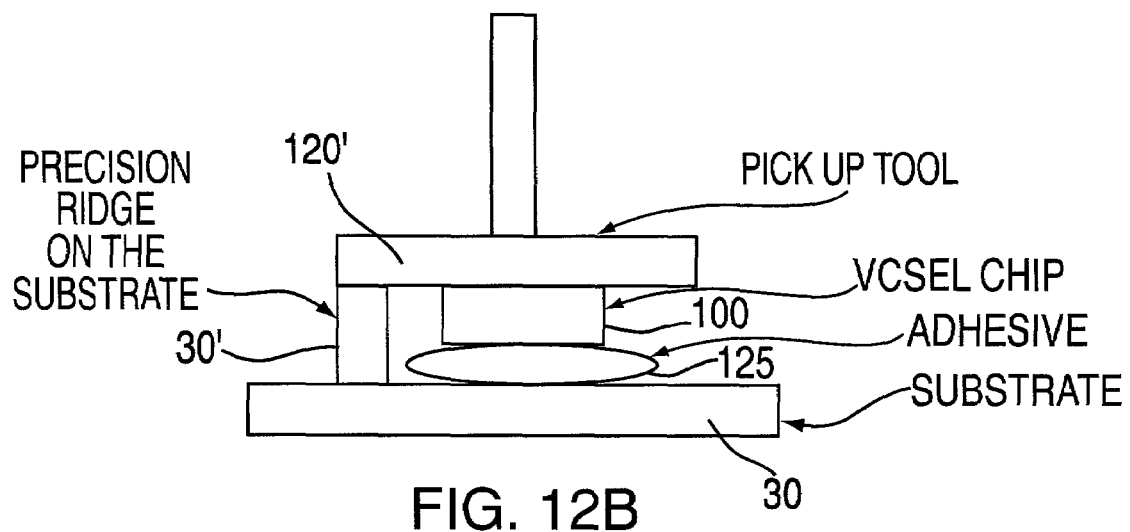

FIGS. 12A and 12B show methods for the precise height control of VCSEL chip mounting for a passively focused VCSEL module. The control of the height directly effects the positioning of the chip with respect to a focusing lens in a cap as shown in the previous embodiments. Typically, the chip is mounted on a substrate using a bonding agent. The bonding agent can be a low viscous liquid adhesive dispensed in a prescribed amount on a substrate and the chip is then mounted under controlled pressure during cure. Alternatively, the bonding agent can be an adhesive film called a pre-form having a known thickness. The chip is mounted on the film and cured under controlled pressure. Both methods depend on precision control of pressure and amount in volume or thickness of the adhesives.

Alternatively, one can make a precision step 121 in the pickup tool 120 and place the machine so that no matter how much adhesive 125 is under the chip 110 between the chip and the substrate 30, the step will always place the chip at a fixed height above the substrate 30, reducing the height variation from part to part.

A GRIN or other small lens can be embedded in the cap and the cap can be either a hermetic package or a non-hermetic package. Generally, if a purely plastic package is used with current invention, it is typically non-hermetic because moisture can permeate plastic.

Alternatively, as shown in FIG. 12B, a precision ridge 30' can be machined on the substrate 30 which cooperates with pickup tool 1201 to achieve the same result.

Figure 10:
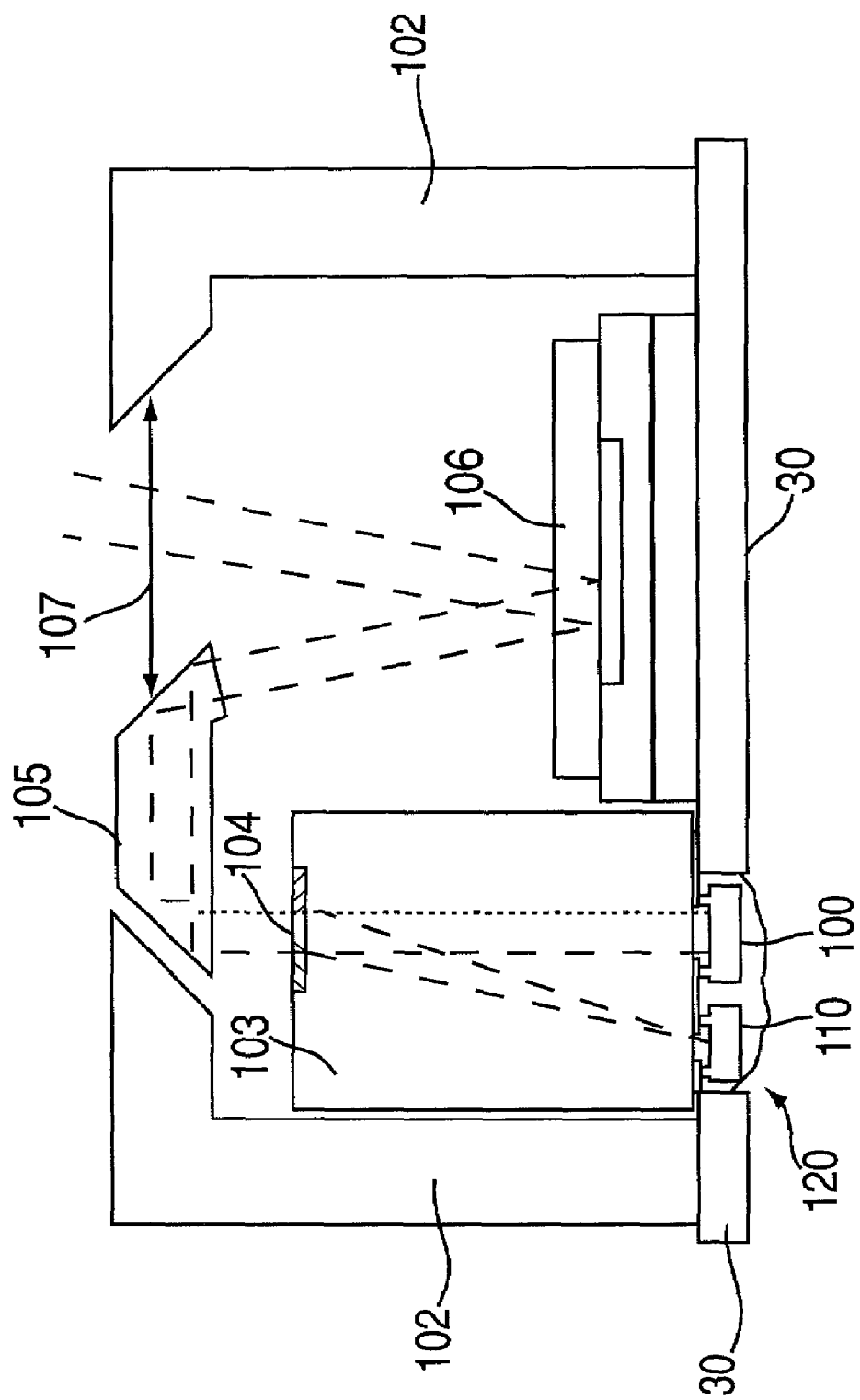
FIG. 10 is another embodiment of a scanner subassembly according to the invention.

The flip chip technique of mounting the power monitoring detector and VCSEL onto the substrate is shown in FIG. 10. The VCSEL 100 and power monitor 110 are mounted in the flip chip manner onto the substrate 30. The assembly is then mounted onto the substrate 30, or leads can be attached to create a stand alone surface mountable module. In the embodiment shown in FIG. 10, the focusing module 103 is placed over the VCSEL and has a lens 104 and allows light to go to a reflective element 105 in the top of the plastic cap 102. The reflective element 105 reflects light onto the micromirror 106, which directs the beam out through the aperture 107 in the top of the plastic for scanning a bar code. Alternatively, the micromirror 106 can be oscillated to create a scanned beam.

FIG. 13A and FIG. 13B show an integrated retroreflective miniature scanner using a silicon micromachined mirror and a surface emitting laser diode. In this embodiment, the laser, signal detectors, scanning element and electronics are assembled on a common substrate, while the optics are on a different plane.

In the retro-reflective integrated scanning system shown in FIGS. 13a and 13b, the VCSEL 100 and an optional power monitoring photodiode 110 for laser power control are mounted on a substrate 30. The collection photodiode 131 that receives reflected light from the bar code, the micromirror 132 for optical scanning and other electronics (not shown) are mounted on a common substrate. Standard electronic assembly techniques can be used for the mounting. The optical cap 134, which can be injection molded, is mounted on the substrate with the aid of machine vision or other precision mechanical alignment features, such as guiding pins. The focusing mirror 135 focuses and directs light from the VCSEL to the scan mirror 132 producing a flying spot on a bar code. The optical signal reflected from the bar code is collected by the collection fold mirror 133 and directed to the collection photodiode 131. Since the collection field of view follows the scanning of the scan mirror, this a retroreflective arrangement. The aperture is optionally needed to reduce part and process variations to achieve passive VCSEL focusing and to obtain an elliptical spot. The light blocked by the aperture is collected by a power monitoring photo diode for VCSEL power control. The desired mirror curvatures are formed in the mold and the reflective surface can be achieved by evaporation coating. The rest of the top surface on the cap can be antireflection coated to improve transmission efficiency. For best beam profile and minimum aberrations, off-axis parabolic or elliptical shaped mirror designs are desirable for the collection fold mirror 133.

FIGS. 14A, 14B and 14C show the mirrors in the cap relative to the photodiodes and the scan mirror. Specifically, the collection fold mirror is 133, the focusing mirror is 135 and the scan mirror 132. A filter 138 can be placed over the photodiode 131. The photodiode also has an aperture 139 between the filter and the photodiode 131.

The optical cap can be assembled and fixed on the substrate in a manner similar to those embodiments described hereinbefore.

The VCSEL and photodiodes can be mounted next to the scanning mirror as shown in the previous embodiments, or they can be mounted in holes on the frame on the scanning mirror as shown.

In this case, the hole serves as an aperture stop for the collection photodiode. A spectral filter can be inserted into the hole to block ambient light as well. Alternatively, the VCSEL and photodiodes can also be mounted on the top surface of the frame of the scanning mirror.

"Smiley" Correction

Figure 20:
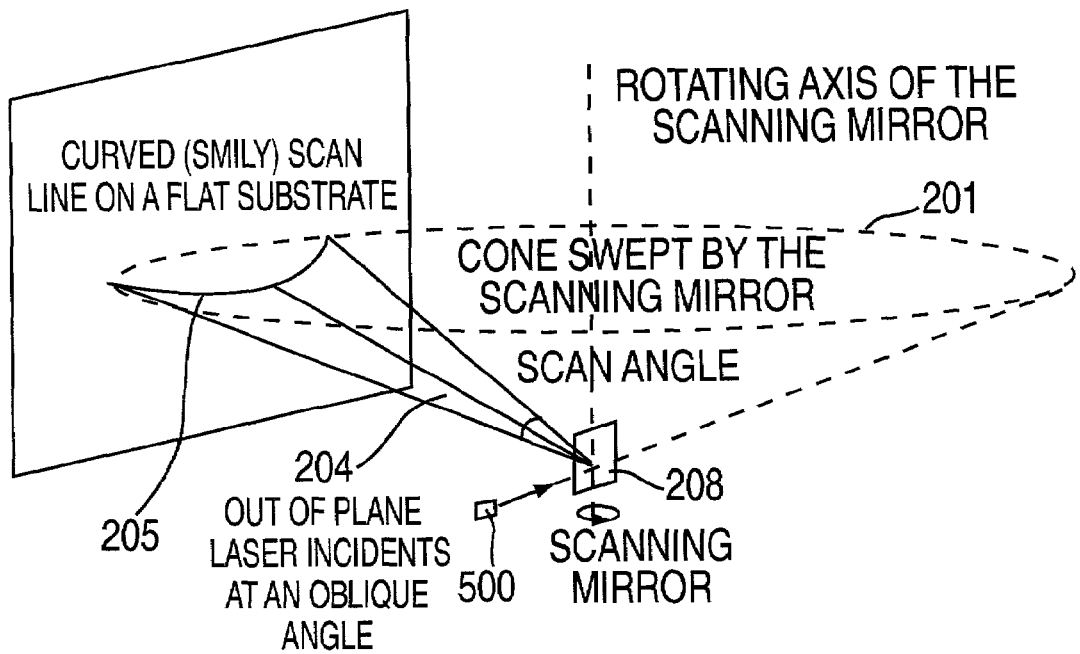
FIG. 20 shows a curved scan line, the so-called "smiley" line, resulting from the intersection of a flat surface with a cone swept by the scanning mirror.

In a typical flying-spot laser scanner that consists of an oscillating mirror that scans a focused laser, and where the laser and the rotation axis of the scanning mirror are not perpendicular to each other, the mirror sweeps out a curved line on a flat bar code target. The resulting scan line is shown in FIG. 20 as a section of a cone 201 swept by the scanning mirror, with the laser light 204 emerging from the vertex of this cone. The curved laser line on the bar code target is the result of intersecting a side of a cone with a plane. This curved line 205 is generally known as "smiley" in the bar code scanning industry. The more oblique is the out-of-plane incident angle from the laser 500 to the scanning mirror 208, the more profound is the "smiley" curve 205. Besides aesthetic reason, a curved line would make reading of two-dimensional and short one-dimensional bar codes difficult or impossible.

Figure 21:
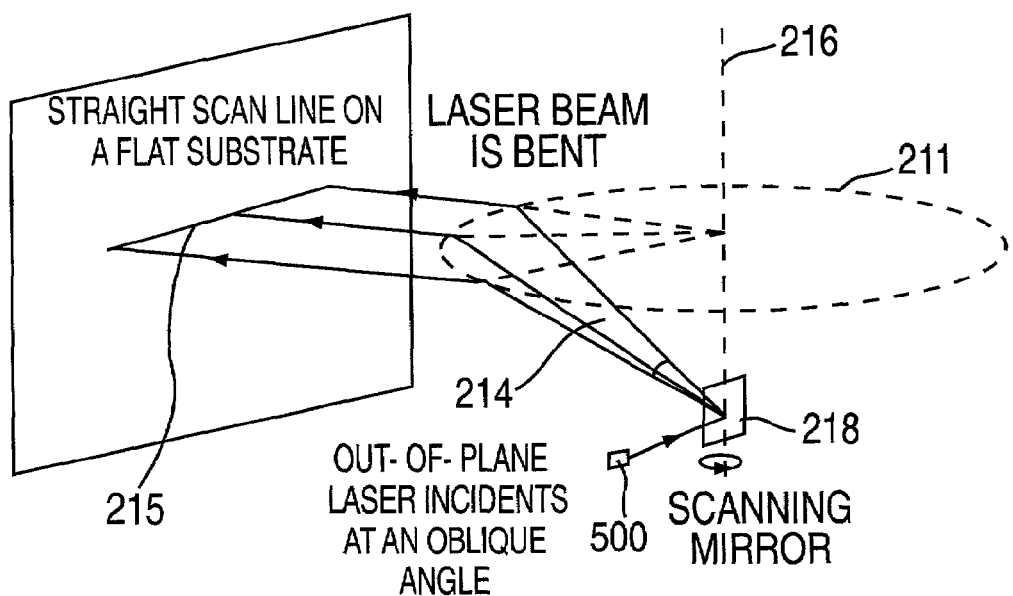
FIG. 21 shows a straight "smiley" scan line, resulting when the laser beam is bent back by the incident angle, so that the final scanned line is perpendicular to the scanning axis.

Referring to FIG. 21, one way to eliminate the "smiley" is to bend back the scan laser beam by the incident angle so that the final scanned line 215 is perpendicular to the scanning axis 216. To the target, it seems as though the laser beam from the laser 500 is emerging from the projection of the vertex of the scanning cone 211 onto the base of the cone, rather than from the vertex itself.

Figure 22:
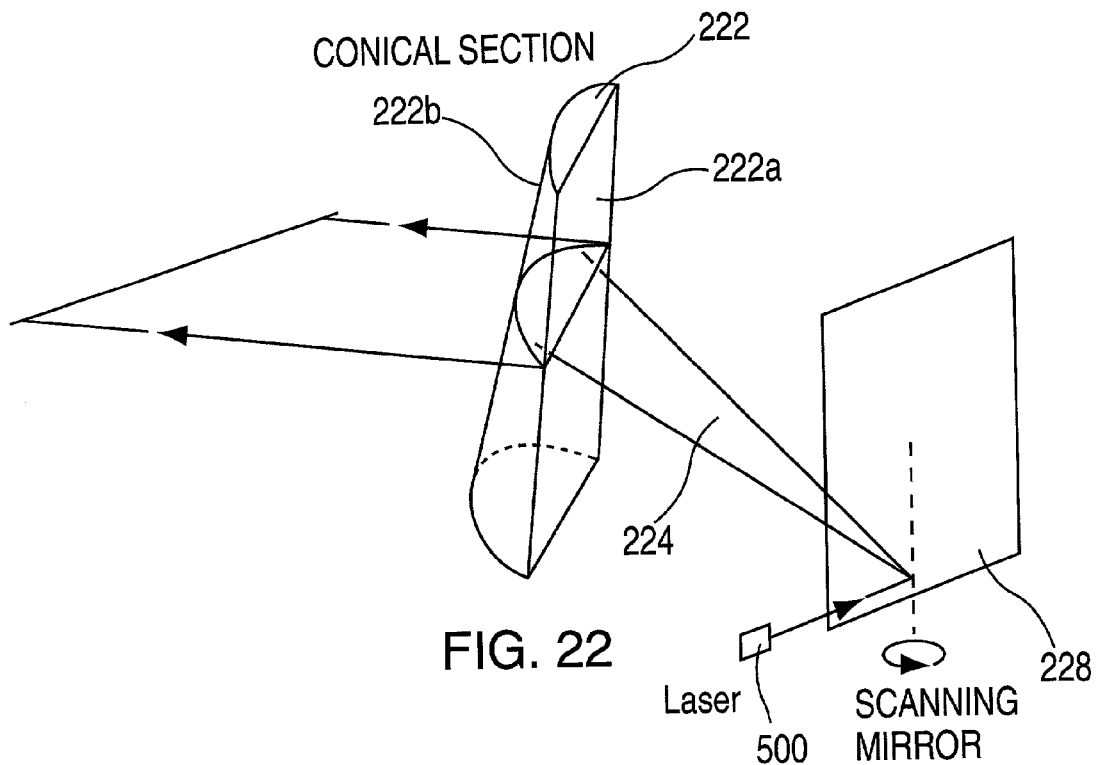
FIG. 22 shows one optical arrangement using a plano-convex conical section according to the invention that eliminates or reduces the "smiley" scan line.

An optical arrangement according to the invention that eliminates the "smiley" line is shown in FIG. 22. It shows a conical section 222 inserted in the laser path to eliminate the "smiley" line. The input surface 222a of the conical section faces the scan mirror and the exit surface 222b faces the bar code. The input surface could be flat. The exit surface of the conical section is conical and is realized by sweeping a right triangle (a cut of a prism) by the scan angle around the rotation axis of the scanning mirror. This arrangement is defined as a "plano-convex" configuration in this patent, and the apex angle of the right angle is called the "prism angle" in the context of this patent.

Figure 23:
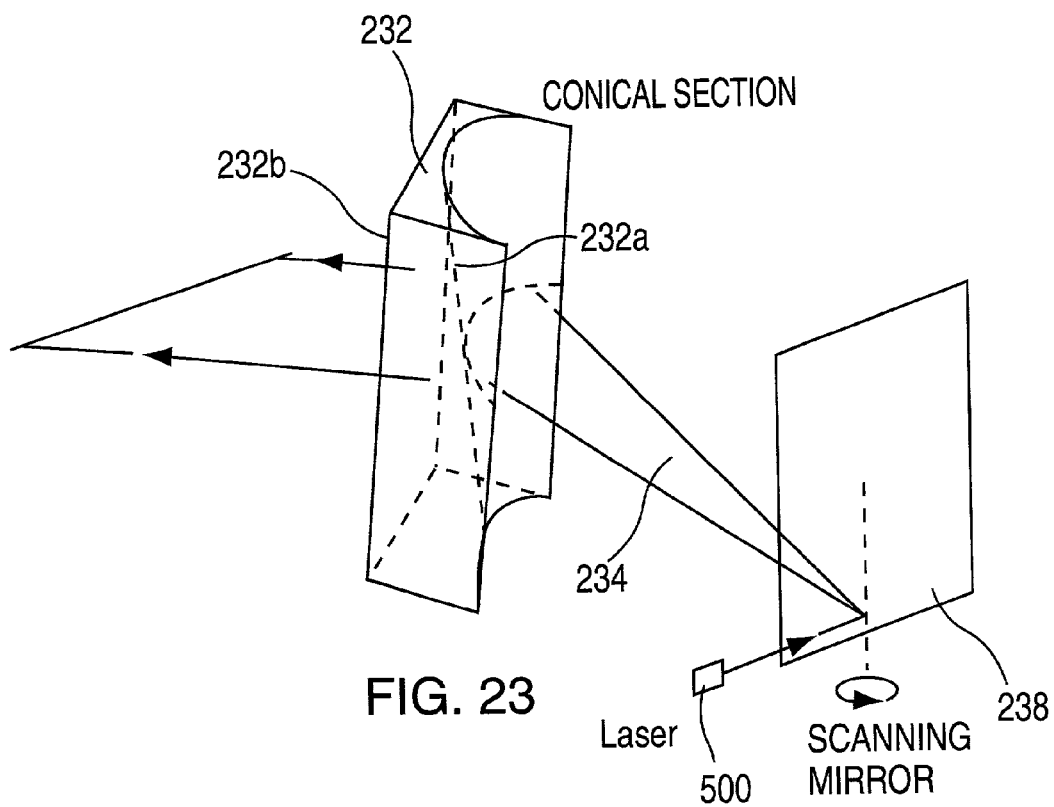
FIG. 23 shows another optical arrangement using a plano-concave conical section according to the invention that eliminates or reduces the "smiley" scan line.

FIG. 23 shows another optical arrangement that utilizes conical section 232, which is a so-called "plano-concave" version, where the concave surface is the input surface 232a, oriented toward the scanning mirror, and the flat surface 232b faces the bar code. Again, the flat surface is oriented at the "prism" angle with respect to the concave surface. Such conical sections can be optically molded or ground.

Alternatively, an optical element that combines both types of optical arrangements discussed above, the so-called "convex-concave" configuration, may be used in accordance with current invention to eliminate the "smiley" line.

In order to completely eliminate the "smiley", the optical arrangements must satisfy the following two conditions:

The curvature of the curve surface must match the radius of curvature of the scanning cone, which is related to the distance of the conical section from the scanning mirror and the scan angle.

The "prism" angle of the conical section must tilt the beam so that when the beam leaves the conical section, its direction is perpendicular to the rotating axis of the scanning mirror, as shown in FIG. 21.

It should be noted, however, that with a conical section which somewhat deviates from the above two conditions, it is still possible to reduce, as opposed to completely eliminating, the curvature of the "smiley" scan line. In some applications, reduced curvature of the "smiley" line is an acceptable solution due to other system constraints.

Figure 24:
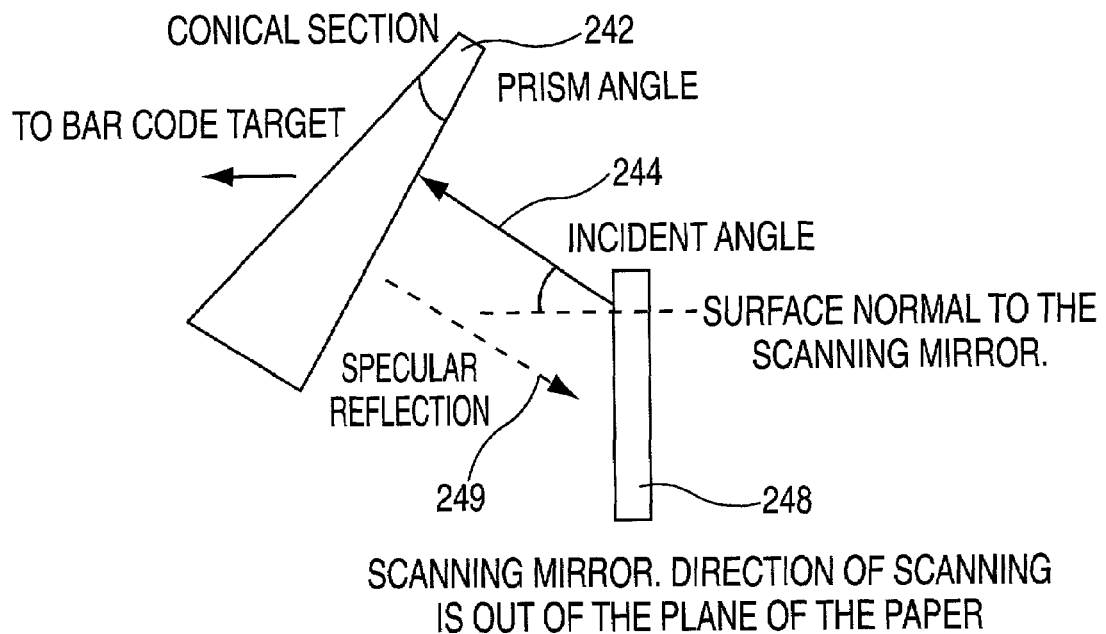
FIG. 24 shows a sectional view of one particular orientation of the conical section with respect to the scan mirror according to the invention.
Figure 25:
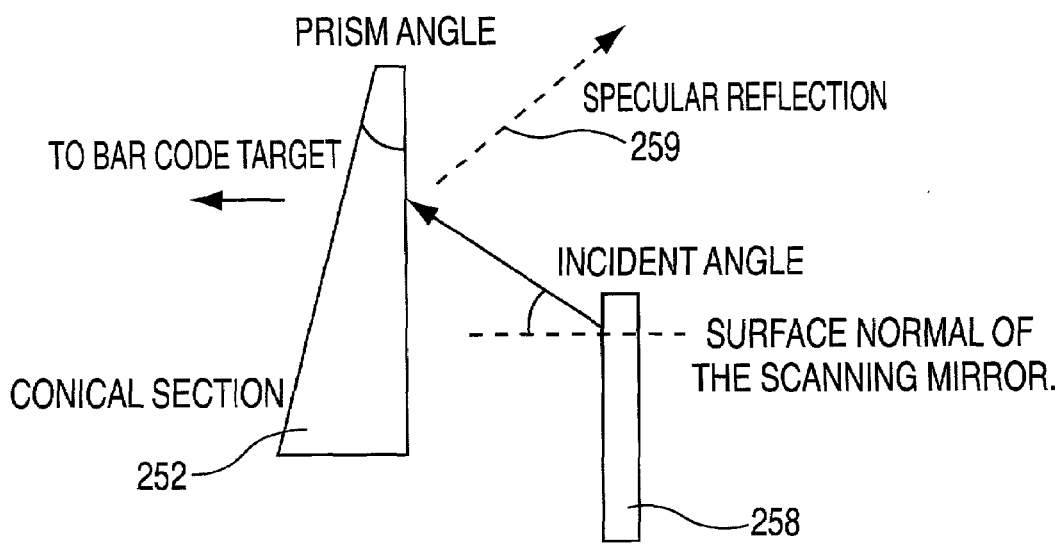
FIG. 25 shows a sectional view of another orientation of the conical section with respect to the scan mirror according to the invention that directs specular reflection away from the scanning mirror.

The orientation of the conical section with respect to the incident scanned beam is important in accomplishing the objects of the invention as illustrated in sectional views in FIGS. 24 and 25. In FIG. 24, the incident laser beam 244 is perpendicular to the input surface of the conical section 242. In this arrangement, however, the specular reflection 249 from the input surface will be directed back to the scanning mirror 248, which is part of the receiving chain, creating optical noise inside the scanner. This is generally not preferred, particularly in retro-reflective systems. The optical arrangement shown in FIG. 25 is preferred, since specular reflection 259 is directed to some fixed location away from the mirror 258 and can be baffled. It is also understood that other cylindrical or conical surfaces with similar properties and producing the same results may be used to correct the "smiley".

Figure 26:
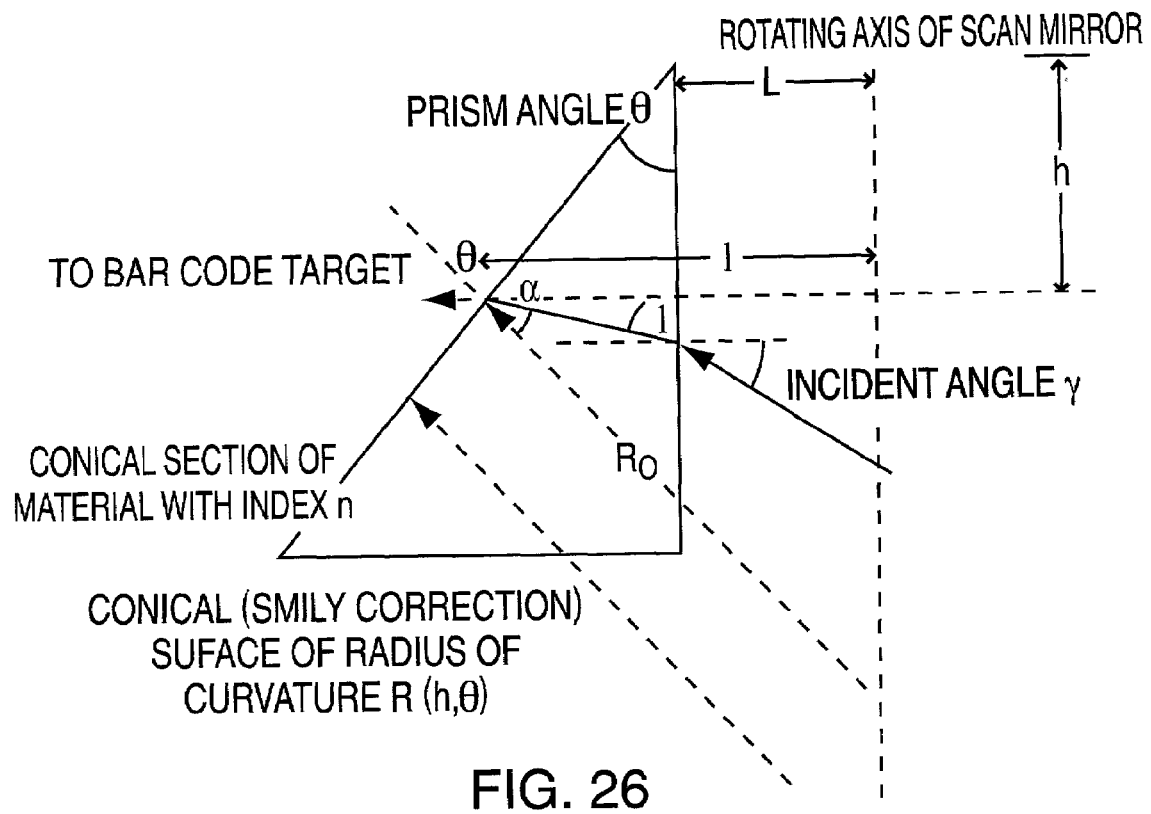
FIG. 26 illustrates the geometry of the conical section for the convex element according to the invention to correct and eliminate the "smiley" scan line.

The "prism" angle of the conical sections for a conical section of the type shown in FIG. 22 that is utilized in current invention is calculated as further described with reference to FIG. 26. The "smiley" correction surface is toward the bar code with radius of curvature R. Legends referring to FIG. 26 are as follows:

γ: incident angle of the scanned laser beam to the conical section;
θ: "prism" angle;
Γ: angle of the laser beam after being refracted at the input flat surface of the conical section;
α: incident angle of the laser beam to the curve surface inside the conical section;
n: index of refraction of the material of the conical section;
R: radius of curvature of the curve surface of the conical section; (R is in a plane that is normal to the curve surface);
l: distance from the rotating axis of the scanning mirror to the intersection of the laser beam and the curve surface of the conical section.

To calculate the "prism" angle, the Snell's law is applied as follows:

$$\theta = \alpha \Gamma$$

$$\sin \gamma = n \sin \Gamma$$

$$n \sin \alpha = \sin \theta$$

Solving the above 3 equations, yields:

TABLE 1

$$\tan\theta = \frac{\sin\gamma}{n\cos\Gamma - 1}$$

$$\text{but} \quad \cos\Gamma = \frac{\sqrt{n^2 - \sin^2\gamma}}{n}$$

$$\tan\theta = \frac{\sin\gamma}{\sqrt{n^2 - \sin^2\gamma} - 1}$$

For small incident angle
$n^2 \gg \sin^2\gamma \sim \gamma$
$n \sim 1.5$
we can approximate

TABLE 2

$$\tan\theta \sim \frac{\sin\gamma}{(n-1) - \frac{\sin^2\gamma}{2n}}$$

$$\theta \sim \frac{3\gamma}{1.5 - \gamma^2}$$

In general, the radius of curvature of the conical section is a function of the "prism" angle θ, and other parameters, such as L (the distance between the flat surface and the axis of rotation of the scan mirror), and h (side of the element):

TABLE 3

$$R(h, \theta) = \frac{L + h\tan\theta}{\cos\theta}$$

The radius of curvature $R_0$ of the curve surface at the intersection of the laser beam and the conical surface:

TABLE 4

$$R_o = \frac{l}{\cos\theta}$$

The optical power φ of the cylindrical curvature at the intersection of the laser beam and the curve surface is simply:

TABLE 5

$$\phi = \frac{n-1}{R_o} \sim \frac{1}{2R_o} = \frac{1}{\text{focallength}}$$

For γ=25 degrees, l=5 mm, we calculate:
θ~44 degrees
$R_0$~6.95 mm

ϕ~72 diopters (0.072 mm)
focal length f~13.9 mm

Figure 27:
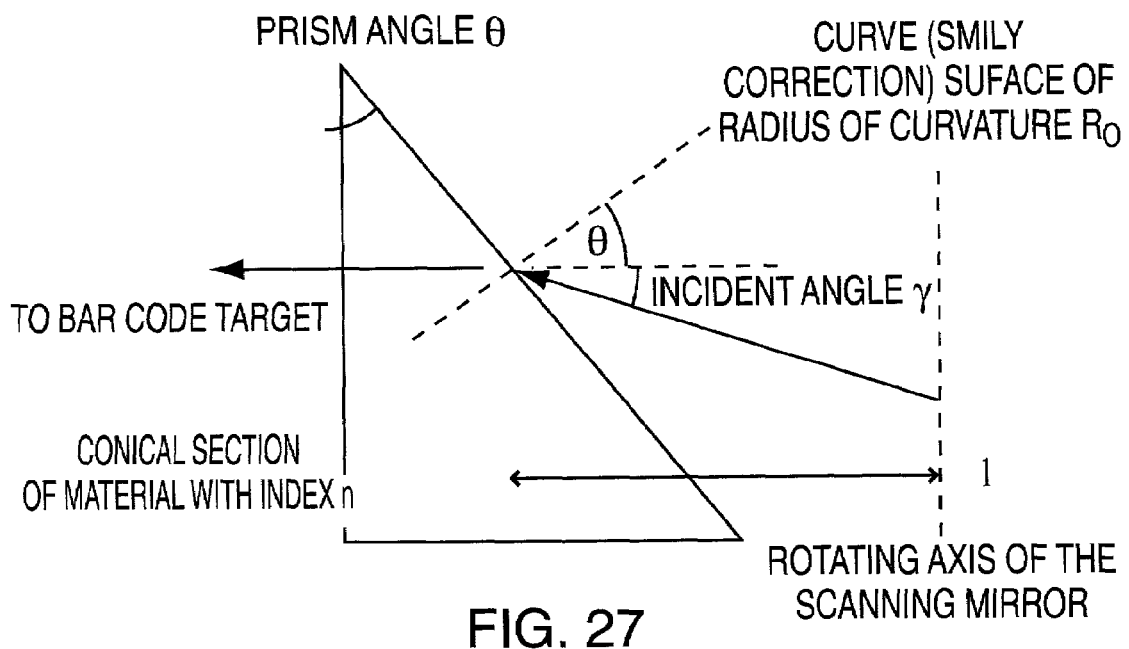
FIG. 27 illustrates the geometry of the conical section for the concave element according to the invention to correct and eliminate the "smiley" scan line.

The "prism" angle of the conical sections for a conical section of the type shown in FIG. 23 that is utilized in current invention is calculated as further described with reference to FIG. 27. The "smiley" correction surface is toward the bar code with radius of curvature R. Legends referring to FIG. 27 are as follows:

γ: A incident angle of the scanned laser beam to the conical section;
θ: "prism" angle;
Γ: angle of the laser beam after being refracted at the input surface of the conical section;
α: incident angle of the laser beam to the curve surface inside the conical section;
n: index of refraction of the material of the conical section;
R: radius of curvature of the curve surface of the conical section; (R is in a plane that is normal to the curve surface);
l: distance from the rotating axis of the scanning mirror to the intersection of the laser beam and the curve surface of the conical section.

To calculate the "prism" angle, the Snell's law is applied as follows:

$$\sin(\theta+\gamma) = n \sin\theta$$

Solving the above equation, yields:

TABLE 6

$$\tan\theta = \frac{\sin\gamma}{n - \cos\gamma}$$

For small incident angles and n~1.5 we can approximate

TABLE 7

$$\theta \sim \frac{\gamma}{n-1} \sim 2\gamma$$

The radius of curvature $R_0$ of the curve surface at the intersection of the laser beam and the correction surface:

TABLE 8

$$R_0 = \frac{l}{\cos\theta}$$

The optical power ϕ of the cylindrical curvature is simply:

TABLE 9

$$\phi = \frac{n-1}{R_0} \sim \frac{1}{2R_0} = \frac{1}{\text{focallength}}$$

For γ=25 degrees, l=5 mm, we calculate:
θ~35 degrees
$R_0$~6 mm
ϕ~82 diopters (0.082 mm)
focal length f~12 mm In bar code scanning, the useful range of the scanner is determined by the size and shape of the laser spot, and the signal to noise ratio. For the sake of discussion, we call the width of the laser spot that is across the spaces and bars in a bar code the x-spot, and the orthogonal width the y-spot. An optical element (lens or mirror) focuses the diverging beam from a laser into the desired spot. By inserting the conical section into the laser path, the x-laser spot is changed, and the upstream focusing optics must be changed accordingly. The required approximated adjustments to the optical power of the upstream optics are described with reference to the following example.

EXAMPLE 1 f: effective focal length of the optical system to create the desired beam spot;
$f_1$: focal length of the curve surface of the conical section that corrects the "smiley";
$f_0$: focal length of the laser focusing optics to maintain the desired laser beam spot;
d: separation between the principal planes of the laser focusing optics and the curve surface of the conical section.

A focusing optics of 4 mm focal length is originally used to focus the laser to the desired spot diameter. The laser incidents at 25 degrees out of plane from a scanning mirror. A conical section of the type shown in FIG. 22 is used to correct the "smiley", and the distance between the principle planes of the laser focusing optic and the conical section is 10 mm. In accordance with calculations above, the focal length of the conical section in one plane (sagittal) is 12 mm, the other plane (longitudinal) does not have optical power. The focal length in the sagittal plane is relevant since it affects the x-spot of the laser.

The new effective focal length f of the system in the sagittal plane is:

TABLE 10

$$\frac{1}{f} = \frac{1}{f_0} + \frac{1}{f_1} - \frac{d}{f_0 f_1}$$

for
$f_0$=4 mm
$f_1$=12 mm
d=10 mm
f=8 mm

The effective focal length of the system is doubled. In order to maintain the same system focal length of 4 mm (i.e., f=4 mm, the focal length of the laser focusing optics must be changed to:

$f_{0,new}$=1 mm

This being a very strong optical element, the alignment is very critical to be practical in many bar code reading applications.

Figure 28:
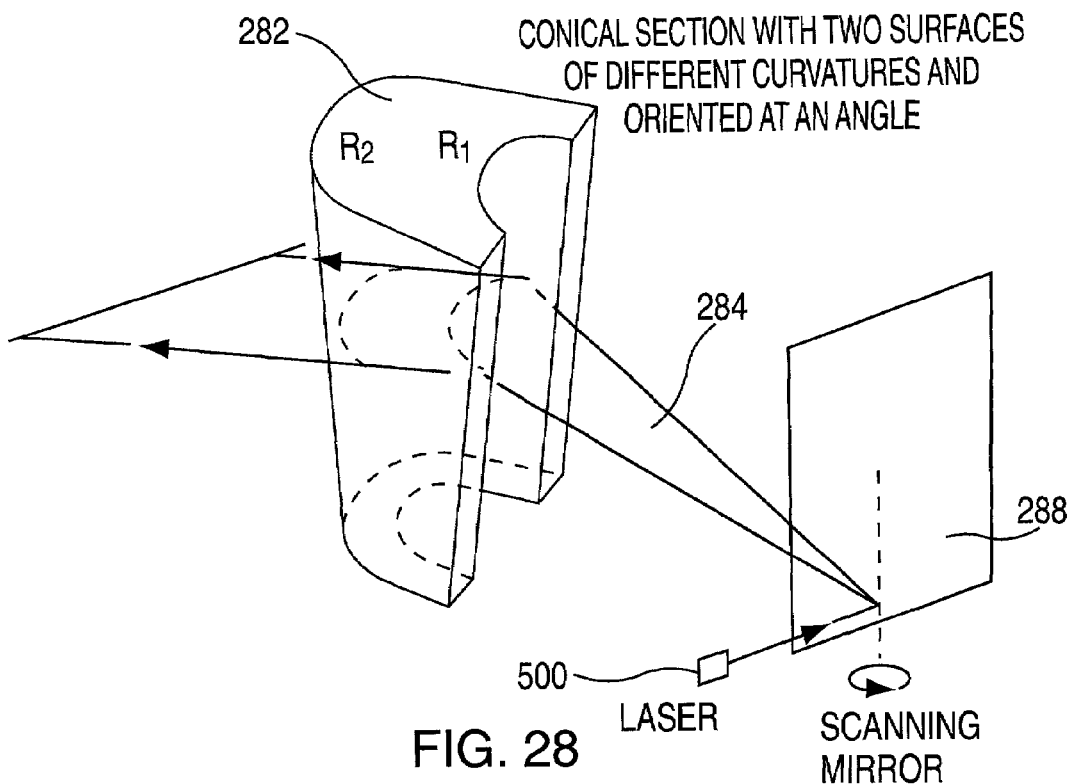
FIG. 28 shows an optical arrangement using a conical section with two surfaces of different curvature according to the invention that eliminates or reduces the "smiley" scan line.

Because of the above consideration, it may be desirable to have two different curvatures $R_1$ and $R_2$ on the two surfaces of the conical section 281, as shown in FIG. 28, rather than a plano-convex or a plano-concave conical sections (with a flat and a curved surface). One curvature, shown as $R_1$ (the conical section) is used to eliminate "smiley", while the other curvature $R_2$ (the cylindrical surface) is used to correct the overall optical power of the system. The required curvatures of the conical sections and laser focusing optics are described with reference to the following example.

EXAMPLE 2

The Following Legends and Discussion is Applicable to the Sagittal Plane f: effective focal length of the optical system to create the desired beam spot;
$f_1$: focal length of the curve surface of the conical section that corrects the "smiley";
$R_1$: curvature of the curve surface of the conical section that corrects the "smiley";
$f_0$: focal length of the laser focusing optics to maintain the desired laser beam spot;
$f_2$: focal length of the other curve surface of the conical section which is used to manipulate the optical power of this element;
$f_c$: focal length of the conical section;
$R_2$: curvature of the other curve surface of the conical section which is used to manipulate the optical power of this element;
D: separation between the principal planes of the laser focusing optics and the conical section;
N: index of refraction of the conical section material.

A focusing optics of 4 mm focal length is originally used to focus the laser to the desired spot diameter. The laser incidents at 25 degrees out of plane from a scanning mirror. A conical section of the type shown in FIG. 23 is used to correct the "smiley", and the distance between the principle planes of the laser focusing optic and the conical section is 10 mm. The radius of curvature of the "smiley" correction surface of the conical section is 6 mm. For this example, the thickness of the conical section is 1 mm, and the radius of curvature of the other surface is 7 mm.

The effective focal length $f_c$ of the conical section is:

TABLE 11

$$\frac{1}{fc} = \frac{1}{f_1} + \frac{1}{f_2} - \frac{t}{nf_1 f_2}$$

$$\frac{1}{fc} = \frac{n-1}{R_1} + \frac{n-1}{R_2} - \frac{(n-1)^2 t}{nR_1 R_2}$$

for
$R_1 = -6$ mm
$R_2 = 7$ mm
t = 1 mm
n = 1.5 where the sign convention has been applied to $R_1$. We obtain:
$f_c = -126$ mm

The new system focal length is now:

TABLE 12

$$\frac{1}{f} = \frac{1}{f_0} + \frac{1}{fc} - \frac{d}{f_0 fc}$$

for
$f_0 = 4$ mm
$f_c = 126$ m
d = 10 mm
f = 3.82 m

To maintain the same system focal length at 4 mm, the focal length of the laser focusing optics needed to be changed to:
$f_{0,new} = 4.195$ mm It is also possible to add some curvature in the "y" direction (orthogonal to the curvature that corrects the "smiley") of the conical section to manipulate the y-spot. This addition is desirable for the purpose of reducing printing noise and speckle noise. In fact, the "smiley" elimination conditions and system optical power can probably be met simultaneously by properly choosing the two curvatures of the "smiley" correction element, and the orientation of the two surfaces, in concert with the upstream focusing optics.

It should be noted that there is a trade-off in the location of the conical section. On one hand, one would want to place it close to the scanning mirror to void having a large optical element. On the other hand, placing such an element too close to the scanning mirror necessitates a large curvature, which is more difficult to fabricate and has strong optical power. Besides the optical power consideration, the conical section could also become the exit window of the scanner.

In a retro-reflective scanner arrangement, the scanning mirror is part of the receiving chain. Sometimes, it determines the signal collection area for the returned bar code signal. With a "smiley" correction element inserted between the bar code and the scanning mirror, the optical power of the conical section in the sagittal plane focuses the returned light in one direction onto the scanning mirror. A smaller scanning mirror could be advantageous in some applications where features such as reduced cost and size of the scanning mirror are important. The downstream optical element(s) in the receiving chain may be designed accordingly. Alternatively, the scanning element can be the photodetector to receive the bar code signal, with a small metallized area to deflect the outgoing laser.

Figure 29:
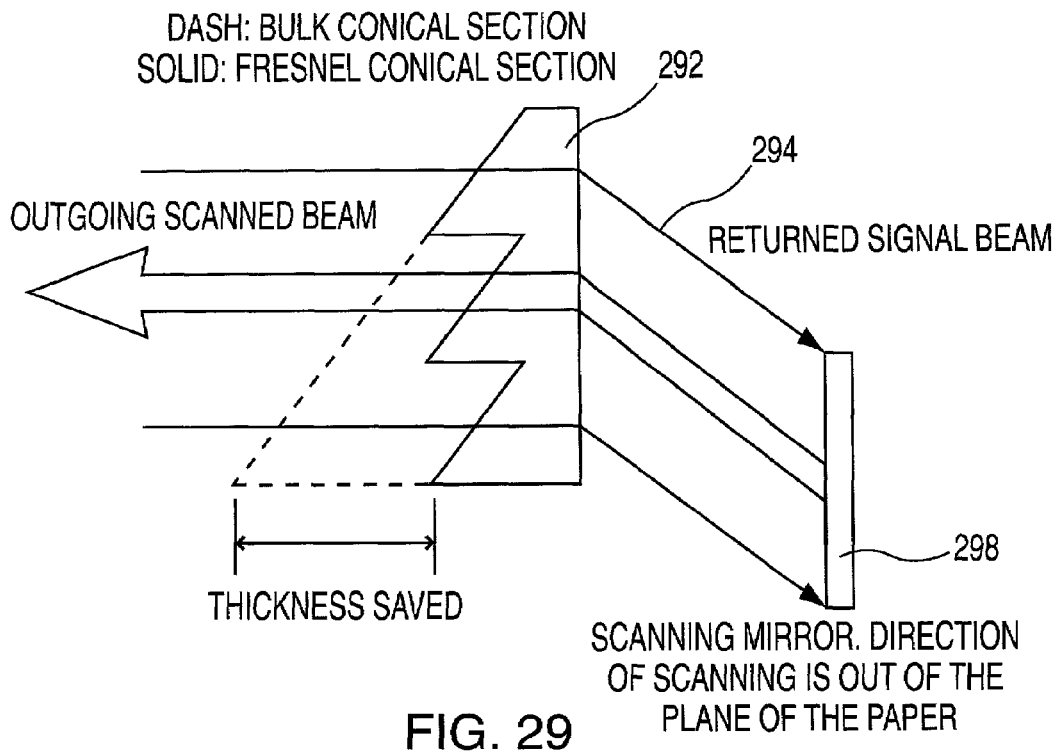
FIG. 29 shows a sectional view of the optical arrangement utilizing a refractive optical element, such as one having a coarse "Fresnel" conical surface on one side of the element, which eliminates or reduces the "smiley" scan line.

Furthermore, in a retro-reflective system according to the invention, the "smiley" correction element must be large enough so that it will not clip the return signal beam. In particular, when the incident angle is large (meaning large "smiley"), the "prism" angle of the conical section must be large proportionally, and its increase in thickness translates to the increase in cost. One way to reduce the thickness of the element is to use a refractive element, as for example having a very coarse conical Fresnel surface 292 on one side (shown in FIG. 29), rather than a bulk conical surface. The pitch of the Fresnel surface must at least accommodate the size of the outgoing scan beam, so that the beam quality is not compromised. The thickness of the section is determined by the size of the outgoing beam, rather than a much larger collection area (hence thicker conical section). Alternatively, it would be obvious to one skilled in the art to utilize another type of a refractive element or a diffractive element to reduce the thickness of the element.

Figure 30:
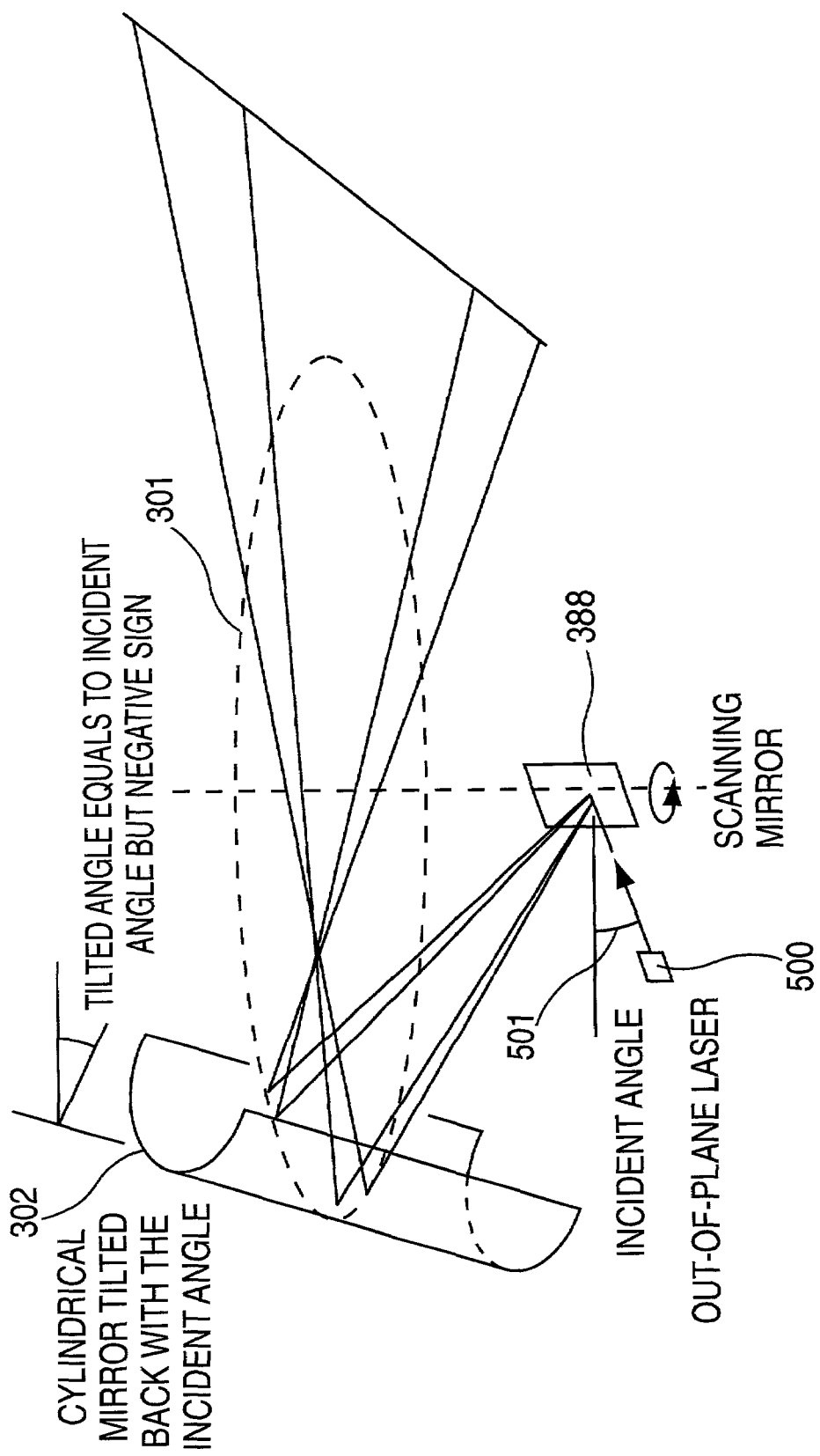
FIG. 30 shows an optical arrangement utilizing a conical mirror according to the invention that eliminates or reduces the "smiley" scan line.

In another embodiment shown in FIG. 30, a reflective element can be used to eliminate "smiley". This is accomplished by using a conical mirror 302 with a curvature that equals to the segment of the scanning cone 301, and is tilted at an angle with magnitude equal to the incident angle 501 of the laser 500, but with opposite sign, as shown in FIG. 30. Due to tolerance of the outgoing projection of the laser beam, the cylindrical mirror will most likely reduce, rather than fully eliminate the smiley, in most instances. Note that the focal point of a curve mirror is half its radius of curvature, and the apparent scanning axis is no longer the rotating axis of the scanning mirror, but some distance away. The optical power of the mirror is twice the curvature and is generally very strong in comparison to the optical power of a refractive optical element.

While the figures showing the optical arrangements for the "smiley" correction depict bulk optical elements, the same functionality of the conical section can be accomplished using diffractive optics in accordance with teachings of the current invention. The primary trade-off in such systems is a thinner element at lower optical efficiency.

Figures 15A, 15B:
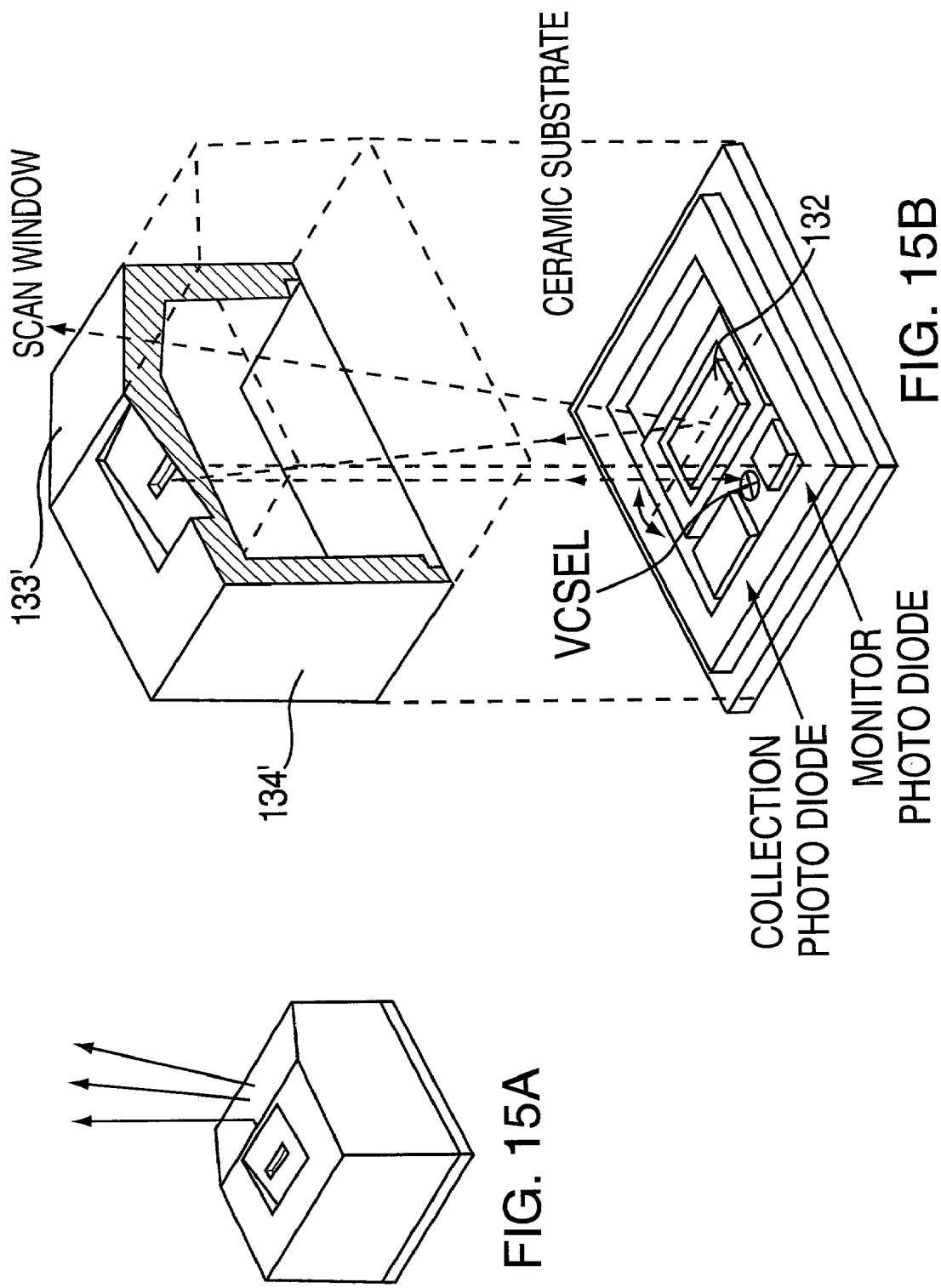
FIGS. 15A-15B is a still further embodiment of a scanner subassembly according to the invention.

As previously discussed, the arrangement of the scan mirror relative to the VCSEL produces a curved scan line. This is a "smiley" effect and the degree of curving is dependent on the angle of incidence to the scan mirror. The embodiments of FIGS. 15A and 15B show retroreflective arrangements that do not produce the "smiley" effect. In this arrangement, the scan mirror 132' oscillates along a different axis. The cap 134' has a slanted scan window 133' for the scan beam.

In both of these arrangements, the exit window can be designed in such a way that it is at the Brewster angle with respect to a polarized VCSEL to maximize optical transmission without the need for an antireflection coding.

Miniaturization of the Scanner Module

FIGS. 16A-16C show a scanner module arrangement wherein the light beams from the VCSELs 100 are focused by the focusing lens 161 and reflected by the prism 162 (or another type of focusing optical element) to the scan mirror 163. The prism can be a total internal reflection (TIR) prism, or its faces can be reflectively coated. The reflected signal from the bar code is collected by a collection lens 164. The collection lens helps limit the field of view of the collecting photodiode 165, but does not scan with the scan mirror 163. A baffle 166 separates the transmission optical train from the collection optical train.

Figures 17A, 17B:
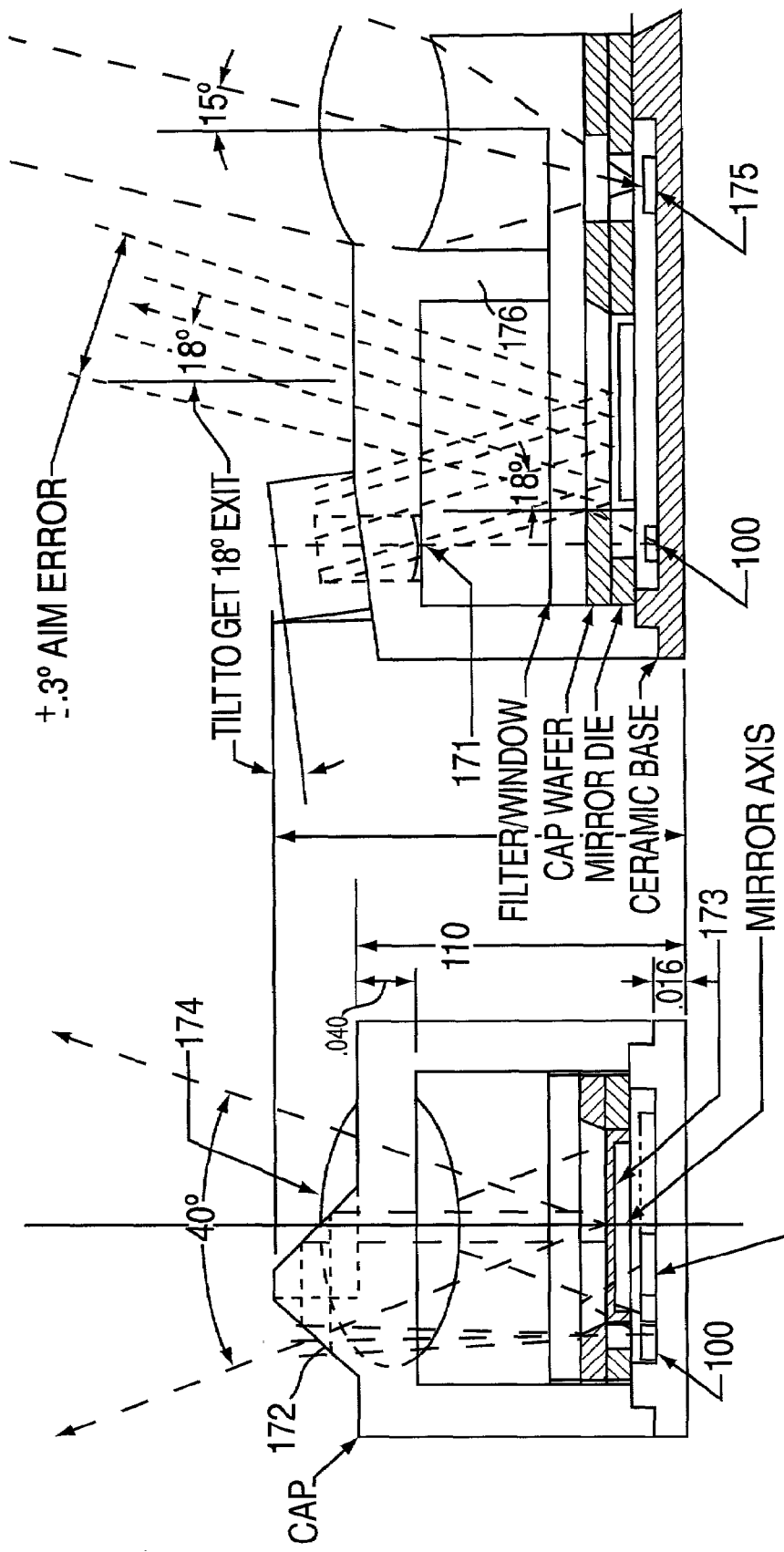
FIGS. 17A-17B is a further embodiment of a scanner subassembly according to the invention.

FIGS. 17A and 17B show an alternative embodiment with a shorter optical path for a non-retroreflective scanner comprising a focusing lens 171, a prism 172, a scan mirror 173, a collection lens 174, a photodiode 175 and a baffle 176.

As shown, in FIGS. 16A-16C, 17A-17B, 33 and 34, the light from the VCSELs is reflected at 90° angle by the prism 162, 172, 332a or 342a, respectively, (or another type of focusing optical element) and then again redirected at an angle to the scan mirror 163, 173, 333 or 343, respectively. So long as the internal reflection is achieved, angles of reflection other than 90° may be used by the prism 162, 172, 332a or 342a, respectively, to achieve the desired result. By utilizing these optical arrangements with shorter scan path, the height of the scanner module may be miniaturized to about 5 mm or less, and the overall scanner's volume may be reduced to about 1 cubic inch or less.

Figure 33:
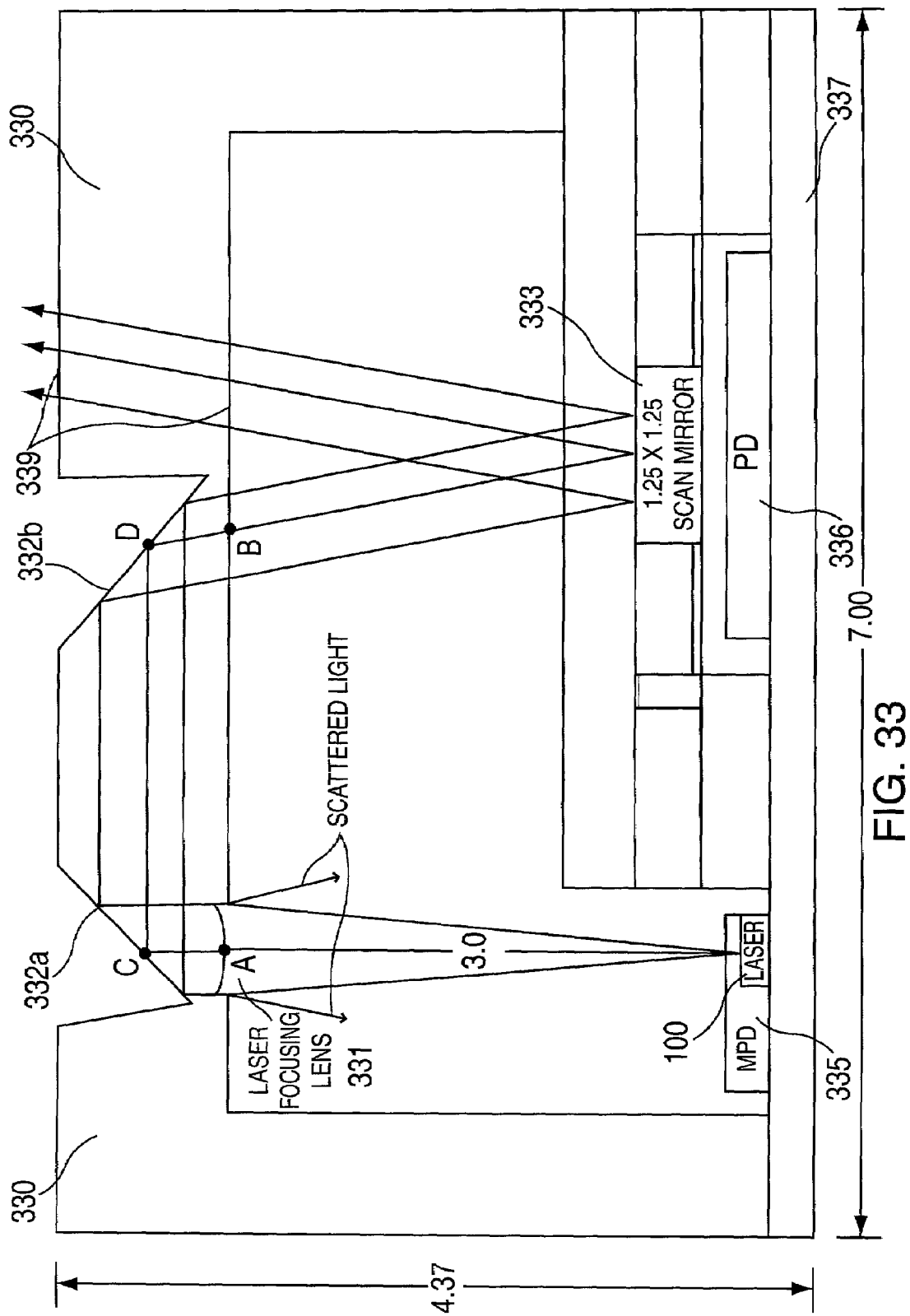
FIG. 33 shows a scanner module according to the invention, having a focusing lens and two total internal reflection (TIR) surfaces that direct light from the laser to the scanning mirror.

Referring to FIG. 33, which shows a similar embodiment of the scanner module to that shown in FIGS. 16a-16c, a part of the light from the VCSEL diode 100 is focused by a focusing lens 331 and reflected at 90° angle at point C toward point D. The focusing lens 331 and an aperture are molded into inner surface of the plastic cap (enclosure) 330. While part of the light from the laser is focused and re-directed from point C to point D, the light reflected off the plastic around the aperture is scattered back to the monitor photodiode (MPD) 335 (or toward another type of feedback sensor).

The focused light is fully reflected by a flat surface 332a that provides total internal reflection (TIR). This surface is on the other side of the plastic cap 330. A second flat surface 332b that satisfies the TIR condition is molded on the same side of the cap. It directs the light to the mirror surface of the micromachined mirror 333. The laser spot that is scanned by the mirror is re-directed and transmitted through the top surface of the plastic cap 330. This surface is polished and constitutes an exit window 339 of the scanner. The light reflected off the scanned symbol is collected by a collection optics and transmitted to the signal photodiode (PD) 336.

All active components of the scanner module, including the VCSEL 100, scanning mirror 333, monitor photodiode (MP) 335, and signal photodiode 336 are preferably mounted on a substrate 337. All optical surfaces of the embodiment shown in FIG. 33 are preferably molded into a transparent plastic cap 330 that is also mounted on the substrate 337, wherein the optical surfaces are positioned at some distance (denoting the height of the scanning module) above the substrate. Alternatively, instead of the exit window 339, a slot is cut out so that the laser beam may exit the plastic cap without encountering any window. It is also understood that the optical surfaces of the scanning module in accordance with the invention may be either bulk refractive optics, Fresnel lenses, diffractive optics, or a combination thereof.

TIR condition happens when the light incidents from a dense material (having a higher index of refraction, $n_h$) to a less dense material (having a lower index of refraction, $n_l$), such as for example from plastic or glass to air. Substantially all (close to 100%) of the light will be reflected at the interface of the two materials when the angle of incidence reaches and surpassed a critical angle that satisfies the following condition:

TABLE 13

$$\theta_c \geq \operatorname{asin}\frac{n_l}{n_h}$$

For glass-air interface, with index of glass ~1.5, the critical angle is

TABLE 14

$$\theta_c \geq \operatorname{asin}\frac{1}{n} \sim \operatorname{asin}\frac{1}{1.5} \sim 42°$$

The index of refraction of a common plastic is around 1.5 as well.

In order to accommodate practical alignment tolerance with current assembly techniques and to achieve a desired focusing depth, the focal length of the focusing lens built in accordance with the embodiment shown in FIG. 33 is preferably 2.5 mm or longer. The lens is formed by creating a curve surface on the plastic cap. A scanner module built in according with the embodiment shown in FIG. 33, and having a 3 sq. mm collection area, may have the following additional specifications:

TABLE 15

| Package: | 4.5 H × 7.5 L × 7.5 W mm |
| --- | --- |
| | (~3/16 × 9/32 × 9/32 in.) |
| | (2 × 1 mm PD, 3 sq. mm collection area) |
| Smiley: | Accommodates 6 to 10 deg. smiley; |
| | 10 deg. smiley shown |
| Placement tolerance: | z: +/−0.025 mm |
| | x, y: +/−0.050 mm |
| Laser pointing error: | +/−4 deg. |
| Cap angular error due to placement: | +/−0.4 deg. |
| Cap prism error: | +/−0.5 deg. |
| Cap feature tolerance: | +/−0.025 mm |

When the optical path ACDB in FIG. 33 is examined, it is understood that it is equivalent to the optical path inside a thick plano-convex lens of center thickness equal to the distance from A to B. For such a lens, its back focal length (BFL) is the same as the effective focal length (EFL), and the laser is generally placed in a close proximity to the BFL location.

Figure 34:
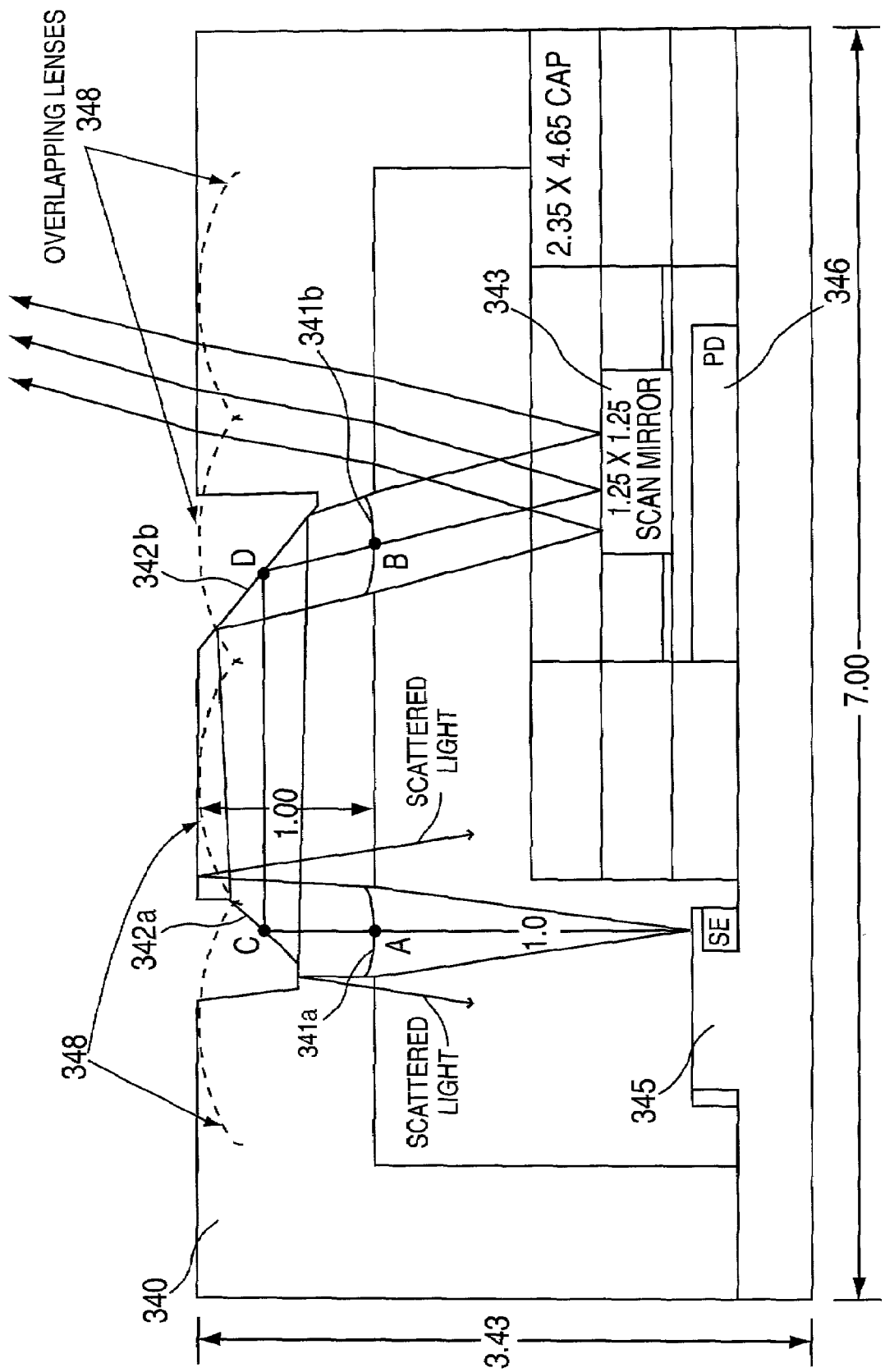
FIG. 34 shows another scanner module according to the invention, having two focusing lenses, two total internal reflection (TIR) surfaces and a plurality of overlapping collection lenses for producing a larger collection area to collect the light scattered from the scanned symbol, while shortening the distance between the collection lenses and a photodiode.

Referring to the embodiment shown in FIG. 34, it is possible to further reduce the height of the scanner module by molding the two focusing lenses 341a and 341b into the plastic cap 340. When the optical path ACDB in FIG. 34 is examined, it is understood that a thick lens of thickness equal to the length from A to B and bounded by two curved surfaces may be used. In addition, if the two curvatures are the same, then the lens is a biconvex lens.

The BFL of a thick lens having curvatures R1 and R2 is typically shorter than its EFL. The equations describing EFL and BFL of a thick lens are as follows:

TABLE 16

$$EFL = \frac{1}{n(R_2 - R_1) + (n-1)t_c}\left[\frac{nR_1R_2}{n-1}\right]$$

$$BFL = \frac{1}{n(R_2 - R_1) + (n-1)t_c}\left[\frac{nR_1R_2}{n-1} - R_2 t_c\right]$$

where $R_1$ and $R_2$ denote the radii of curvature of the curved surfaces of the thick lens; and $t_c$ is the center thickness of the lens.

A scanner built in accordance with the embodiment shown in FIG. 34 may have a BFL of 1.8 mm and an EFL of 3 mm. By reducing the distance between the laser and the lens, the size of the whole scanner module is reduced.

Referring to FIG. 34, one TIR flat surface 342a is used as an aperture, to re-direct light focused by the focusing lens 341a, and the light reflected off the plastic cap around the TIR flat surface is scattered back to the MPD 345. To increase the amount of light collected by the MPD, the area around the aperture may be tilted toward the MPD. Whether this surface is tilted or not, only about 4% of light is reflected, and the direction of the reflection is omni-directional. By adding a curvature to the cap surface around the aperture, more light can be collected, and the reflected light can be concentrated (focused) and directed to the MPD. In addition, the area around the aperture may be another TIR flat surface oriented toward the MPD, so that 100% of that light, instead of 4%, is reflected to the MPD. In such case, the TIR surface utilized to bend the central portion of the light beam that is used for scanning is surrounded by another TIR surface, which directs an annulus of the laser beam to the MPD for laser power monitoring.

The embodiment of FIG. 34 also illustrates use of multiple overlapping lenses 348 in a scanner module built in accordance with the invention. These lenses overlap to produce a larger light collection area (collecting the light scattered from the bar code), while allowing the photodiode 346 to be placed in a close proximity to the back of the lenses.

The focusing power of a lens is determined by its curvature and index of refraction. Typical index of refraction of optical materials ranges from 1.4 to 1.7. To focus light to a close distance, a short focal length lens is required. When a lens with small radius and diameter is employed, it produces a reduced collection area. However, by overlapping multiple lenses, each with a smaller collection area and a short focal length, it is possible to establish a larger combined collection area, while maintaining a shorter distance between the lenses and a photodiode. A single photodiode, or multiple smaller photodiodes could be used with the multiple collection lenses in accordance with the invention.

When multiple collection lenses are utilized, each lens focuses light from the bar code to a spot at a focal point of that individual lens. Thus, with such an arrangement, a larger photodiode is preferred. However, by adding a prism to the back of each lens, either by attachment or by including it in the mold, it is possible to steer the focal point of each lens in such a way that different focal points overlap or/and come closer to each other. Therefore, by bringing focal points closer together a smaller photodiode could be employed, which translates to cost-savings in production of the scanner and an improvement in performance due to the lower capacitance of the photodiode.

Alternatively, instead of adding a prism, the focal points of the collecting lenses could be steered to achieve the same effect as described above by de-centering some of the collection lenses.

A scanner module built in accordance with the embodiment shown in FIG. 34 may have the following specifications:

TABLE 17

| Package: | 3.5 H × 6.5 L × 7 W mm |
| --- | --- |
| | (~9/64 × 1/4 × 9/32 in.) |
| | (0.019" (12 mm) collection area) |
| Smiley: | 15 degrees smiley shown |
| Placement tolerance: | z: +/−0.025 mm |
| | x, y: +/−0.050 mm |
| Laser pointing error: | +/−4 degrees |
| Cap angular error due to placement: | +/−0.4 degrees |
| Cap prism error: | +/−0.5 degrees shown |
| Cap feature tolerance: | +/−0.05 mm |

Figure 35A:
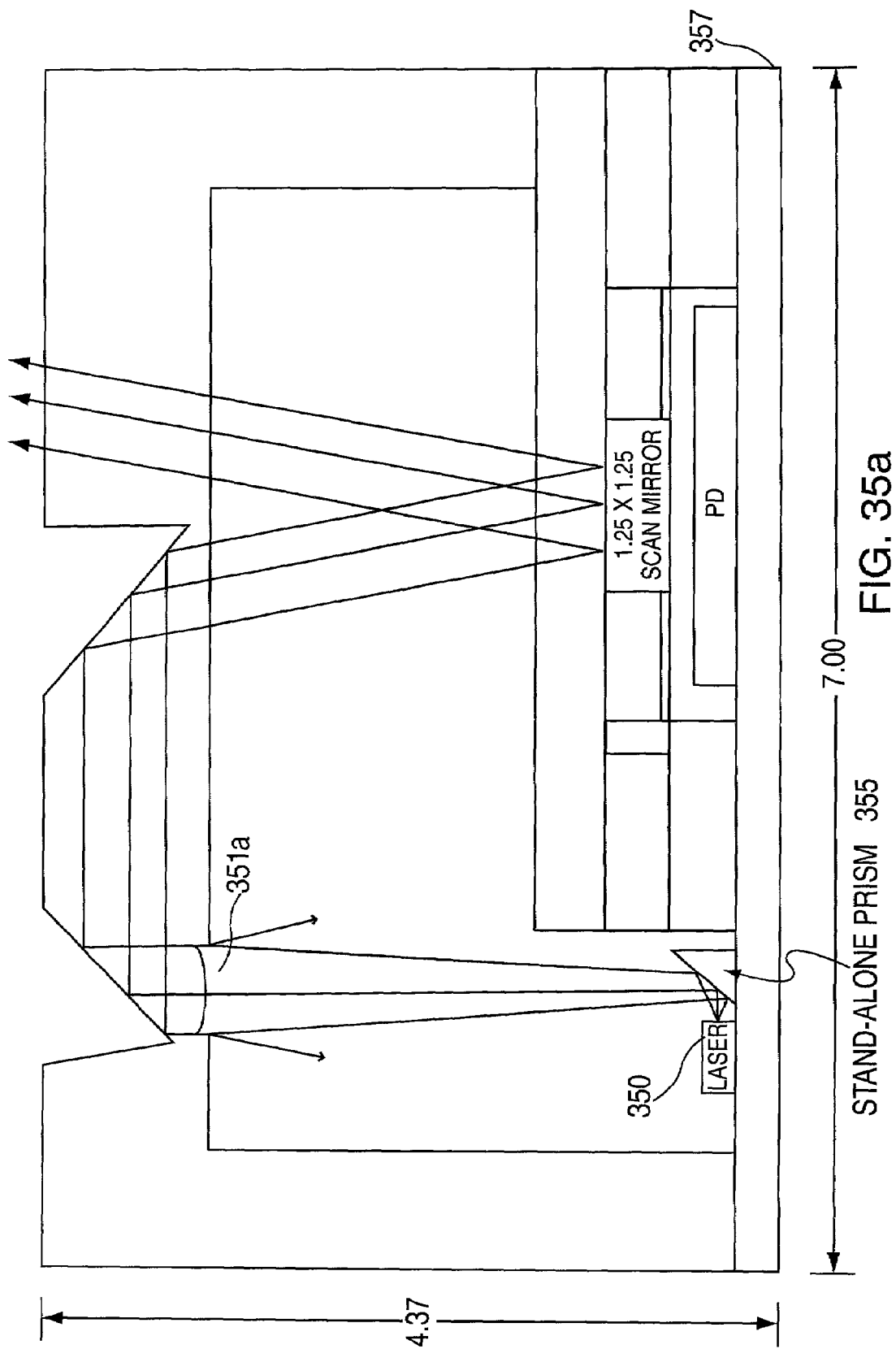
FIG. 35a shows another scanner module according to the invention, which utilizes an edge-emitting laser diode and a prism to bend and re-direct a light beam from the laser at an angle toward a focusing lens, and further having two total internal reflection (TIR) surfaces that direct light from the laser to the scanning mirror.
Figure 35B:
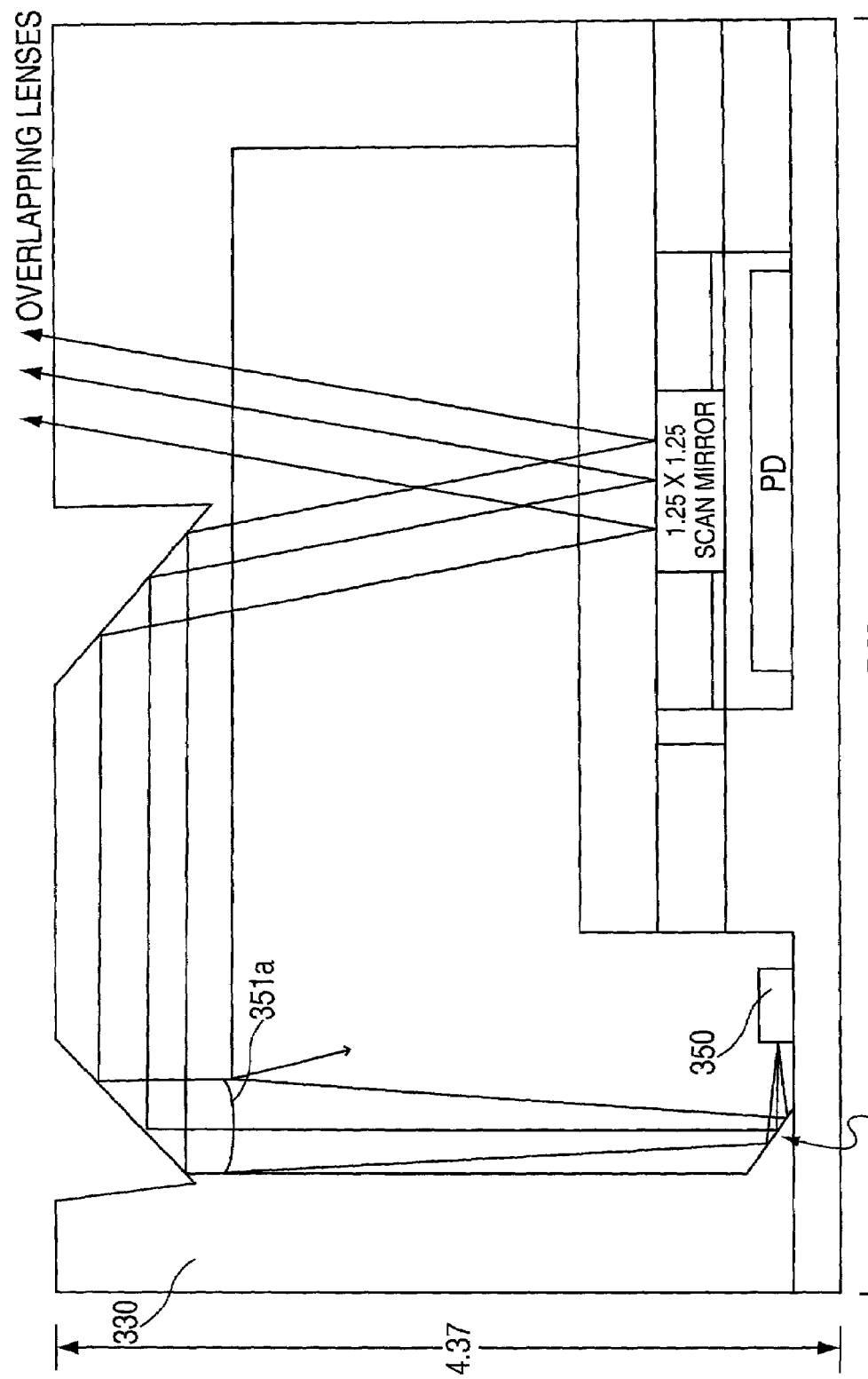
FIG. 35b shows another scanner module according to the invention, which utilizes an edge-emitting laser diode and a prism to bend and re-direct a light beam from the laser at an angle toward a focusing lens, and further having two total internal reflection (TIR) surfaces that direct light from the laser to the scanning mirror, wherein the prism is molded into the plastic cap that encloses the scanner module.

FIGS. 35a and 35b illustrate two alternative embodiments of a scanner module built according to the invention, which utilize an edge-emitting laser diode as a light source. As shown in FIG. 35a, the light from the edge-emitting laser diode 350 is re-directed by a stand-alone prism 355 (or another reflective optical element) at an angle, toward the focusing lens 351a. In the embodiment shown in FIG. 35b, the prism 355' for re-directing the light from the edge-emitting laser diode 350 is molded into the plastic cap 330.

FIGS. 18A, 18B and 18C show embodiments of the scan module of the present invention in a standard interface module, such as PCMCIA card, a flash card, a compact flash card or a Springboard module, for plugging into a module slot in a hand held or portable electronic device, such as a personal digital assistant or the like. The module 180 is disposed in the card 182 as shown and enables scanning to be carried out through a window 181 with the data received from the scanning module being fed to the microcomputer of the electronic device.

FIGS. 19A-19C show how a scanning module according to the present invention inserted into a writing instrument, such as a pen, to give it scanning functionality. Using a the communications circuit, such as a Bluetooth communications circuit, the pen can then scan and transmit the data to a host computer for further processing.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A device for scanning a dataform, comprising:
a surface emitting laser diode for producing a laser beam;
a movable micromachined scanning mirror for scanning the laser beam across the dataform for reflection therefrom as return light;
a collecting optic for collecting the return light from the dataform;
a stationary detector for detecting the return light collected by the collecting optic; and
a substrate on which the laser diode, the scanning mirror and the stationary detector are commonly mounted to constitute a scan module.

2. The device of claim 1, wherein the collecting optic collects the return light directly from the dataform.

3. The device of claim 1, wherein the scanning mirror is constituted of silicon.

4. The device of claim 1, wherein the scanning mirror is connected to a silicon substrate.

5. The device of claim 1, wherein the scanning mirror is driven electrostatically.

6. The device of claim 1, wherein the scanning mirror is suspended between a pair of torsional hinges.

7. The device of claim 1, wherein the laser diode is a vertical cavity surface emitting laser.

8. A device for scanning a dataform, comprising:
a housing;
a surface emitting laser diode in the housing for producing a laser beam;
a movable micromachined scanning mirror in the housing for scanning the laser beam across the dataform for reflection therefrom as return light;
a collecting optic in the housing for collecting the return light from the dataform;
a stationary detector in the housing for detecting the return light collected by the collecting optic; and
a substrate on which the laser diode the scanning mirror and the stationary detector are commonly mounted as a scan module in the housing.

9. The device of claim 8, wherein the collecting optic collects the return light directly from the dataform.

10. The device of claim 8, wherein the scanning mirror is constituted of silicon.

11. The device of claim 8, wherein the scanning mirror is connected to a silicon substrate.

12. The device of claim 8, wherein the scanning mirror is driven electrostatically.

13. The device of claim 8, wherein the scanning mirror is suspended between a pair of torsional hinges.

14. The device of claim 8, and at least one of a keypad and a display on the housing.

15. The device of claim 8, wherein the housing contains a portable electronic device.

16. The device of claim 15, wherein the portable electronic device is a personal digital assistant.

17. The device of claim 8, wherein the housing is embedded in an interface module.

18. A method of reading a dataform, comprising the steps of:
presenting a device that outputs a laser beam from a surface emitting laser diode;
presenting an object with the dataform to the device;
aligning the dataform with the device so that the laser beam is incident on the dataform;
a movable micromachined scanning mirror for scanning the laser beam across the dataform for reflection therefrom as return light;
collecting the return light from the dataform with a collecting optic;
detecting the return light collected by the collecting optic with a stationary detector; and
commonly mounting the laser diode, the scanning mirror and the stationary detector on a substrate to constitute a scan module in the device.

19. The method of claim 18, and constituting the micromachined mirror from silicon.

20. The method of claim 18, wherein the collecting step is performed by collecting the return light directly from the dataform.

21. The method of claim 18, and electrostatically driving the micromachined mirror.

22. The method of claim 18, and suspending the micromachined mirror between a pair of torsional hinges.

23. The method of claim 18, and configuring the laser diode as a vertical cavity surface emitting laser.

* * * * *

UNITED STATES PATENT AND TRADEMARK OFFICE
CERTIFICATE OF CORRECTION

PATENT NO.        : 7,428,995 B1
APPLICATION NO.   : 09/777076
DATED             : September 30, 2008
INVENTOR(S)       : Stern et al.

It is certified that error appears in the above-identified patent and that said Letters Patent is hereby corrected as shown below:

In Fig. 9C, Sheet 9 of 31, delete "OPAQUE/OR" and insert -- OPAQUE OR --, therefor.
(SUBSTITUTE DRAWINGS DATED SEPTEMBER 6, 2001, SHEET 9/31, FIGURE 9C)

In Column 9, Line 34, delete "1201" and insert -- 120' --, therefor
(ORIGINALLY FILED SPECIFICATION DATED FEBRUARY 5, 2001, PAGE 31, LINE 1)

In Column 12, Line 4, delete "θ=αΓ" and insert -- θ=α+Γ --, therefor
(ORIGINALLY FILED SPECIFICATION DATED FEBRUARY 5, 2001, PAGE 40, LINE 4)

In Column 15, Line 40, delete " $\frac{1}{f_c} = \frac{1}{f_1} + \frac{1}{f_2} - \frac{t}{nf_1 f_2}$ " and insert -- $\frac{1}{f_c} = \frac{1}{f_1} + \frac{1}{f_2} - \frac{t}{nf_1 f_2}$ --, therefor.

(ORIGINALLY FILED SPECIFICATION DATED FEBRUARY 5, 2001, PAGE 49, LINE 17)

In Column 15, Line 42, delete " $\frac{1}{f_c} = \frac{n-1}{R_1} + \frac{n-1}{R_2} - \frac{(n-1)^2 t}{nR_1 R_2}$ " and insert -- $\frac{1}{f_c} = \frac{n-1}{R_1} + \frac{n-1}{R_2} - \frac{(n-1)^2 t}{nR_1 R_2}$ --, therefor.

(ORIGINALLY FILED SPECIFICATION DATED FEBRUARY 5, 2001, PAGE 49, LINE 18)

UNITED STATES PATENT AND TRADEMARK OFFICE
CERTIFICATE OF CORRECTION

PATENT NO. : 7,428,995 B1
APPLICATION NO. : 09/777076
DATED : September 30, 2008
INVENTOR(S) : Stern et al.

It is certified that error appears in the above-identified patent and that said Letters Patent is hereby corrected as shown below:

In Column 15, Line 59, delete " $\frac{1}{f} = \frac{1}{f_0} + \frac{1}{f_c} - \frac{d}{f_0 f_c}$ " and insert -- $\frac{1}{f} = \frac{1}{f_0} + \frac{1}{f_c} - \frac{d}{f_0 f_c}$ --, therefor.

(ORIGINALLY FILED SPECIFICATION DATED FEBRUARY 5, 2001, PAGE 50, LINE 12)

In Column 19, Line 12, delete "R1 and R2" and insert -- $R_1$ and $R_2$ --, therefor. (ORIGINALLY FILED SPECIFICATION DATED FEBRUARY 5, 2001, PAGE 61, LINES 17-18)

In Column 21, Line 37, in Claim 8, delete "diode" and insert -- diode, --, therefor (AMENDMENTS TO THE CLAIMS DATED APRIL 9, 2008, PAGE 3, CLAIM 242, LINE 11)

Signed and Sealed this

Twenty-fourth Day of November, 2009

David J. Kappos
*Director of the United States Patent and Trademark Office*